United States Patent
Yamasaki

(10) Patent No.: US 7,940,473 B2
(45) Date of Patent: May 10, 2011

(54) ZOOM LENS AND IMAGE PICKUP APPARATUS INCLUDING THE SAME

(75) Inventor: Shinji Yamasaki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 46 days.

(21) Appl. No.: 12/559,204

(22) Filed: Sep. 14, 2009

(65) Prior Publication Data

US 2010/0067119 A1 Mar. 18, 2010

(30) Foreign Application Priority Data

Sep. 16, 2008 (JP) ................................. 2008-236320

(51) Int. Cl.
*G02B 15/14* (2006.01)
(52) U.S. Cl. ........................................ 359/687; 359/684
(58) Field of Classification Search .................. 359/687, 359/684
See application file for complete search history.

(56) References Cited

U.S. PATENT DOCUMENTS

| | | | |
|---|---|---|---|
| 5,009,492 A * | 4/1991 | Hamano | ........................ 359/684 |
| 6,084,722 A | 7/2000 | Horiuchi | |
| 6,118,593 A | 9/2000 | Tochigi | |
| 6,606,194 B2 * | 8/2003 | Hamano et al. | ................ 359/557 |
| 7,400,453 B2 | 7/2008 | Tomioka | |

FOREIGN PATENT DOCUMENTS

| | | |
|---|---|---|
| JP | 2000-227548 | 8/2000 |
| JP | 2002-182109 | 6/2002 |
| JP | 2002-287027 | 10/2002 |

* cited by examiner

*Primary Examiner* — Scott J Sugarman
(74) *Attorney, Agent, or Firm* — Canon U.S.A., Inc., IP Division

(57) ABSTRACT

A zoom lens includes, in order from object to image side, a first lens unit having a positive refractive power, a second lens unit having a negative refractive power and movable during zooming, a third lens unit having a positive refractive power and including a positive lens element positioned nearest to an object-side end, and a fourth lens unit having a positive refractive power and movable during zooming. The second lens unit includes at least three negative lens elements arranged successively and independently along an optical axis and at least one positive lens element. The zoom lens satisfies specific numerical conditions defined for a focal length fw of the zoom lens at a wide-angle end, focal lengths f2 and f3 of the second and third lens units, and a focal length f31 of a positive lens element of the third lens unit nearest to the object-side end.

8 Claims, 17 Drawing Sheets

ZOOM LENS AND IMAGE PICKUP APPARATUS INCLUDING THE SAME

BACKGROUND OF THE INVENTION

1. Field of the Invention

The present invention relates to zoom lenses suitable for use as image-taking lenses included in image pickup apparatuses such as video cameras, monitoring cameras, digital still cameras, broadcast cameras, and silver-halide film cameras.

2. Description of the Related Art

Image-taking optical systems included in image pickup apparatuses, such as video cameras, monitoring cameras, and digital still cameras, employing solid-state image pickup devices are desired to be zoom lenses having wide angles of view, high zoom ratios, and high optical performance. Such a demand is satisfied by some known zoom lenses each including four lens units: first to fourth lens units having positive, negative, positive, and positive refractive powers, respectively, in order from an object side to an image side.

Some of such zoom lenses are of a rear-focusing type in which the second lens unit is moved for zooming and the fourth lens unit is responsible for focusing and correction of image-plane variation accompanying zooming, as disclosed in U.S. Pat. Nos. 7,400,453 and 6,084,722.

Zoom lenses included in recent image pickup apparatuses, such as video cameras and monitoring cameras, are desired to be small, to have wide angles of view and high zoom ratios, and to have high optical performance over the entire zoom range.

To reduce the overall size of such a zoom lens, the refractive powers of the lens units included in the zoom lens can be increased. However, if the refractive powers of the lens units are simply increased, aberration variation accompanying zooming is increased, making it difficult to obtain good optical performance over the entire zoom range.

Compared with a case of a zoom lens in which the first lens unit is moved for focusing, the first lens unit of a rear-focusing zoom lens has a small effective diameter, and it is therefore easy to reduce the overall size of the zoom lens. Instead, aberration variation accompanying focusing is increased, and it is therefore difficult to obtain high optical performance over the entire object-distance range from an object at infinity to a near object.

Considering the facts described above, to reduce the overall size and increase the angle of view of such a rear-focusing zoom lens including four lens units while maintaining a certain level of zoom ratio, it is important to appropriately design the second and third lens units, specifically, the refractive powers of the second and third lens units, the numbers of negative lens elements included in the second and third lens units, the shapes and arrangement of the negative lens elements, and so forth.

SUMMARY OF THE INVENTION

The present invention provides a zoom lens having a wide angle of view and realizing high optical performance over the entire zoom range with a small overall size, and to an image pickup apparatus including the zoom lens.

According to a first aspect of the present invention, a zoom lens includes, in order from an object side to an image side, a first lens unit having a positive refractive power, a second lens unit having a negative refractive power and configured to move during zooming, a third lens unit having a positive refractive power and including a positive lens element at a position nearest to an object-side end, and a fourth lens unit having a positive refractive power and configured to move during zooming. The second lens unit includes at least three negative lens elements arranged successively and independently along an optical axis and at least one positive lens element. The zoom lens satisfies the following conditional expressions:

$$0.65 < f31/f3 < 1.05$$

$$-1.80 < f2/fw < -1.35$$

$$3.50 < f3/fw < 5.60$$

where fw denotes a focal length of the zoom lens at a wide-angle end, f2 and f3 denote focal lengths of the second and third lens units, respectively, and f31 denotes a focal length of a positive lens element of the third lens unit nearest to the object-side end.

According to a second aspect of the present invention, an image pickup apparatus includes a zoom lens and a solid-state image pickup device configured to receive an optical image formed by the zoom lens. The zoom lens include, in order from an object side to an image side, a first lens unit having a positive refractive power, a second lens unit having a negative refractive power and configured to move during zooming, a third lens unit having a positive refractive power and including a positive lens element at a position nearest to an object-side end, and a fourth lens unit having a positive refractive power and configured to move during zooming. The second lens unit includes at least three negative lens elements arranged successively and independently along an optical axis and at least one positive lens element. The zoom lens satisfies the following conditional expressions:

$$0.65 < f31/f3 < 1.05$$

$$-1.80 < f2/fw < -1.35$$

$$3.50 < f3/fw < 5.60$$

where fw denotes a focal length of the zoom lens at a wide-angle end, f2 and f3 denote focal lengths of the second and third lens units, respectively, and f31 denotes a focal length of a positive lens element of the third lens unit nearest to the object-side end.

Further features of the present invention will become apparent from the following description of exemplary embodiments with reference to the attached drawings.

DESCRIPTION OF THE EMBODIMENTS

Embodiments of the zoom lens and the image pickup apparatus including the same according to the present invention will now be described.

Zoom lenses according to embodiments described below each include, in order from an object side to an image side, a first lens unit having a positive refractive power, a second lens unit having a negative refractive power, a third lens unit having a positive refractive power, and a fourth lens unit having a positive refractive power.

When zooming is performed, the second and fourth lens units are moved. When focusing is performed, the fourth lens unit is moved.

An additional lens unit having a refractive power, such as a converter lens, may be provided on at least one of the object side of the first lens unit and the image side of the fourth lens unit.

Figure 1:
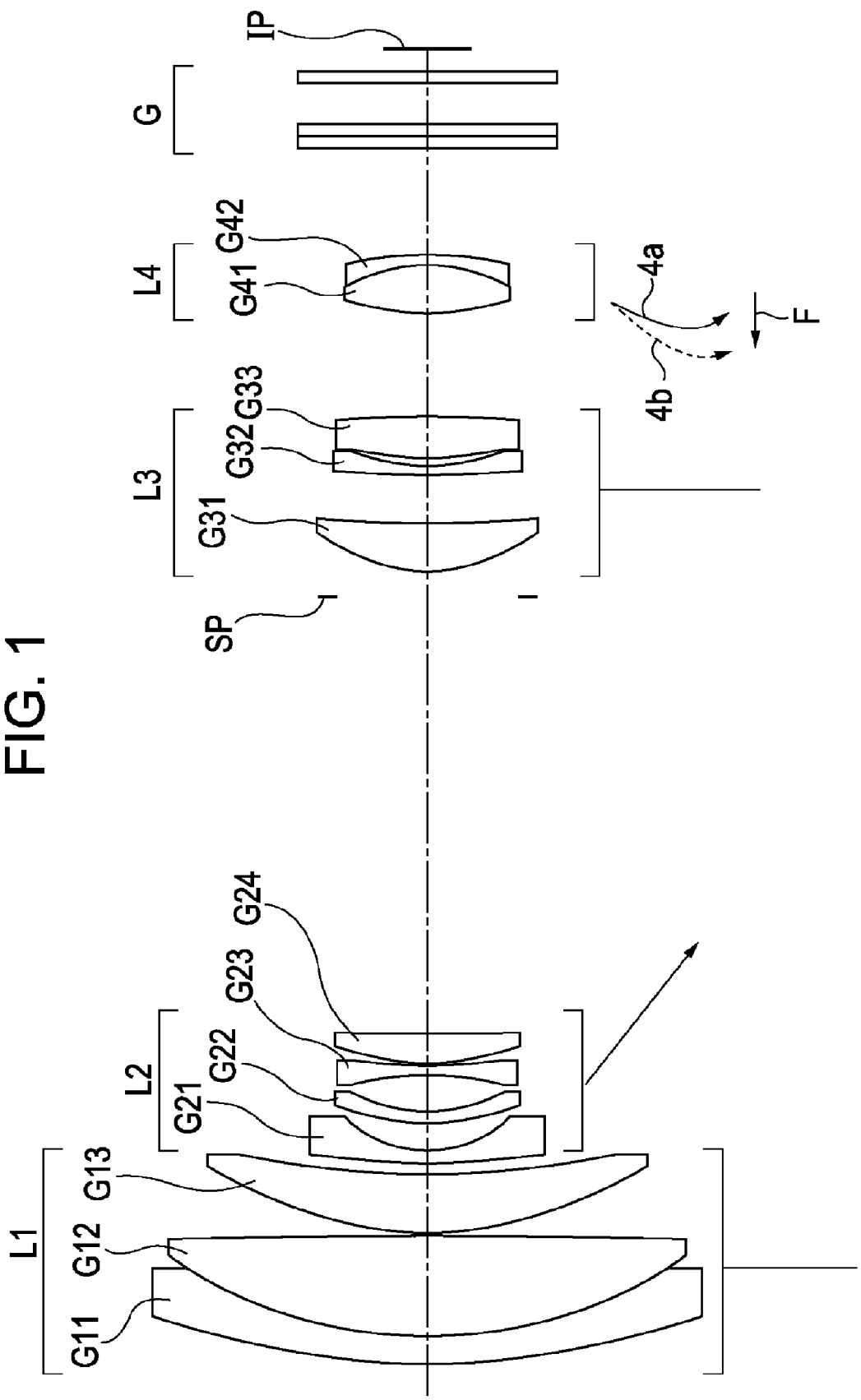
FIG. 1 is a cross-sectional view of a zoom lens according to a first embodiment of the present invention at a wide-angle end.
Figure 2:
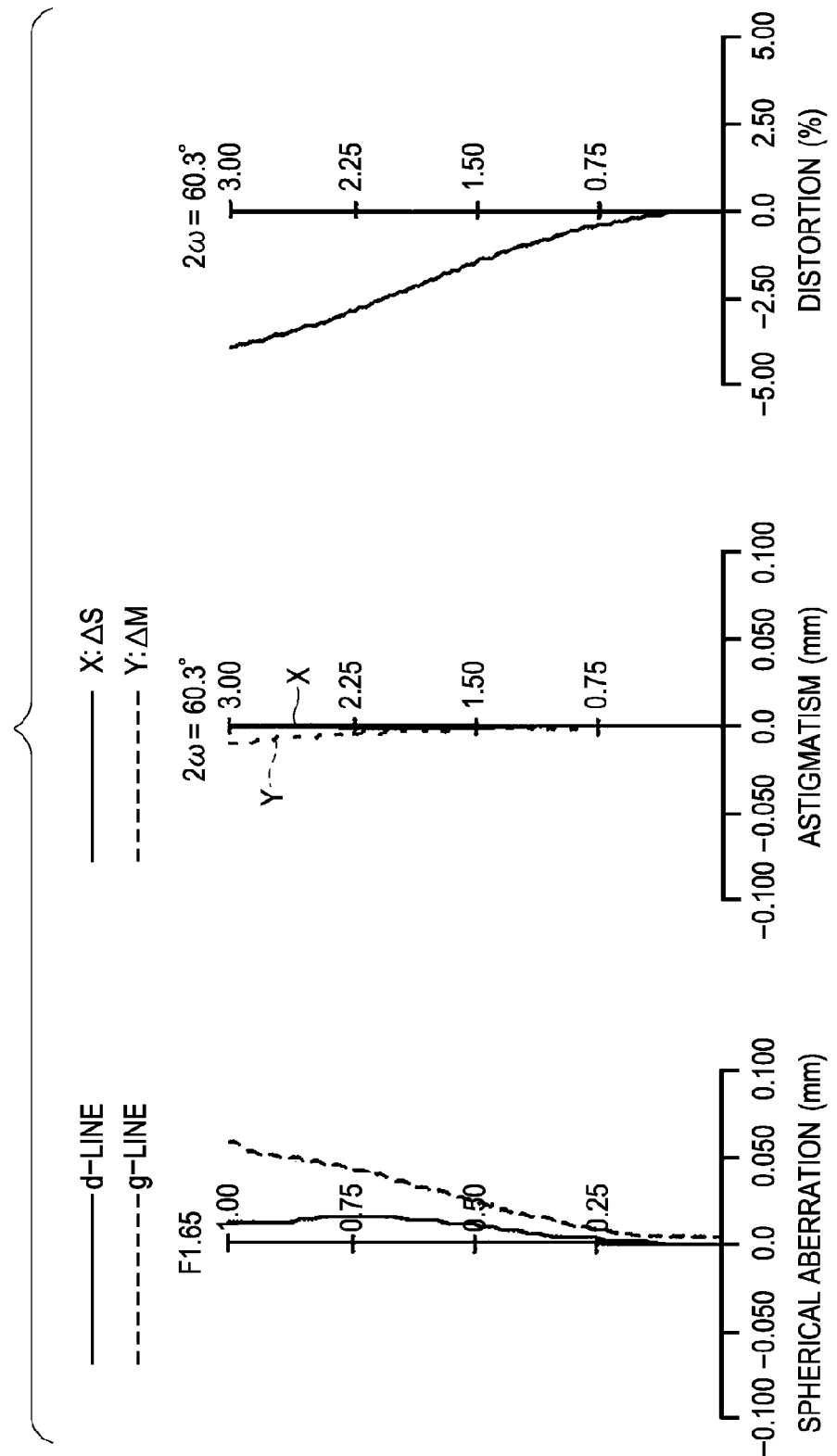
FIG. 2 includes diagrams showing aberrations occurring in the zoom lens of the first embodiment at the wide-angle end.
Figure 3:
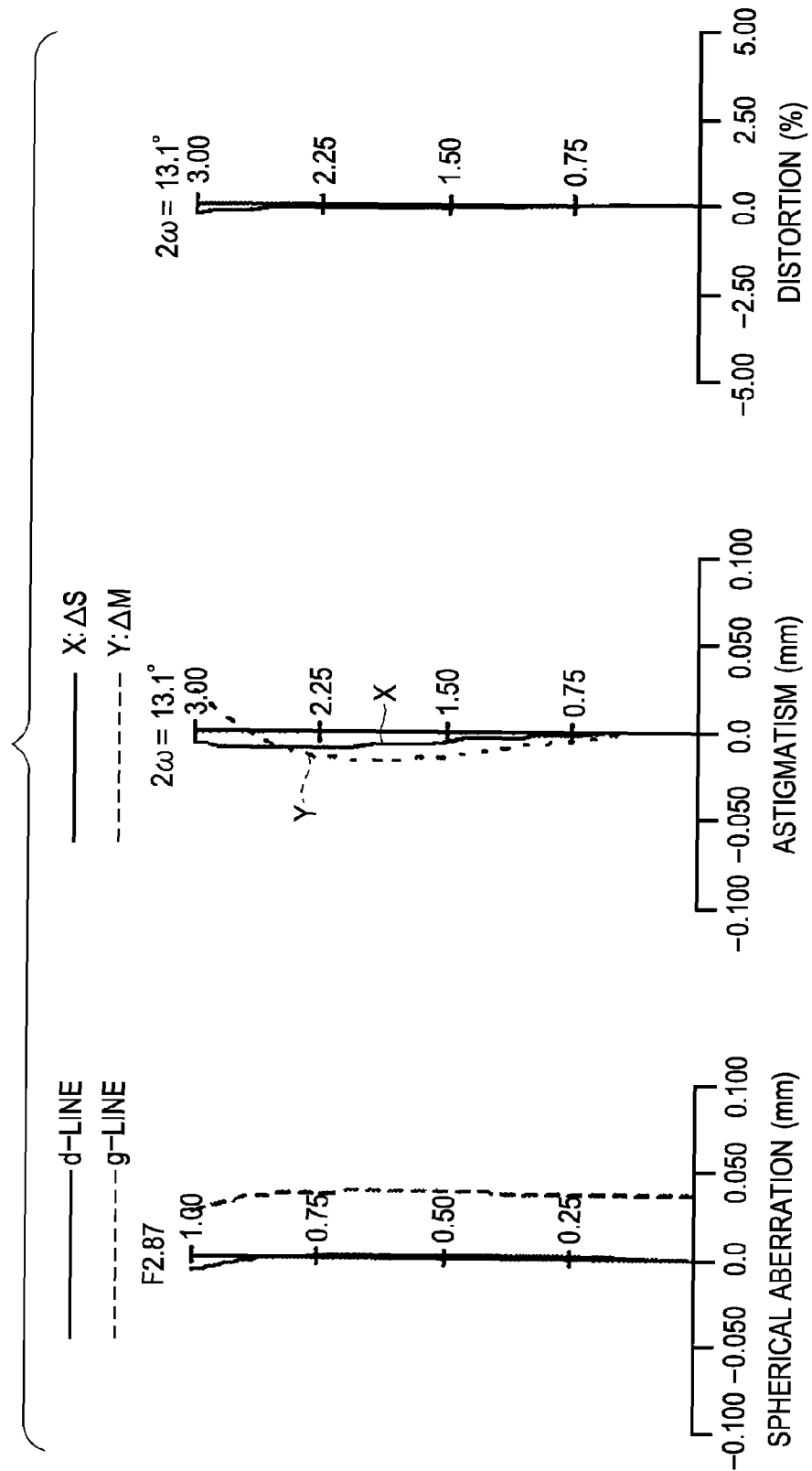
FIG. 3 includes diagrams showing aberrations occurring in the zoom lens of the first embodiment at an intermediate zoom position.
Figure 4:
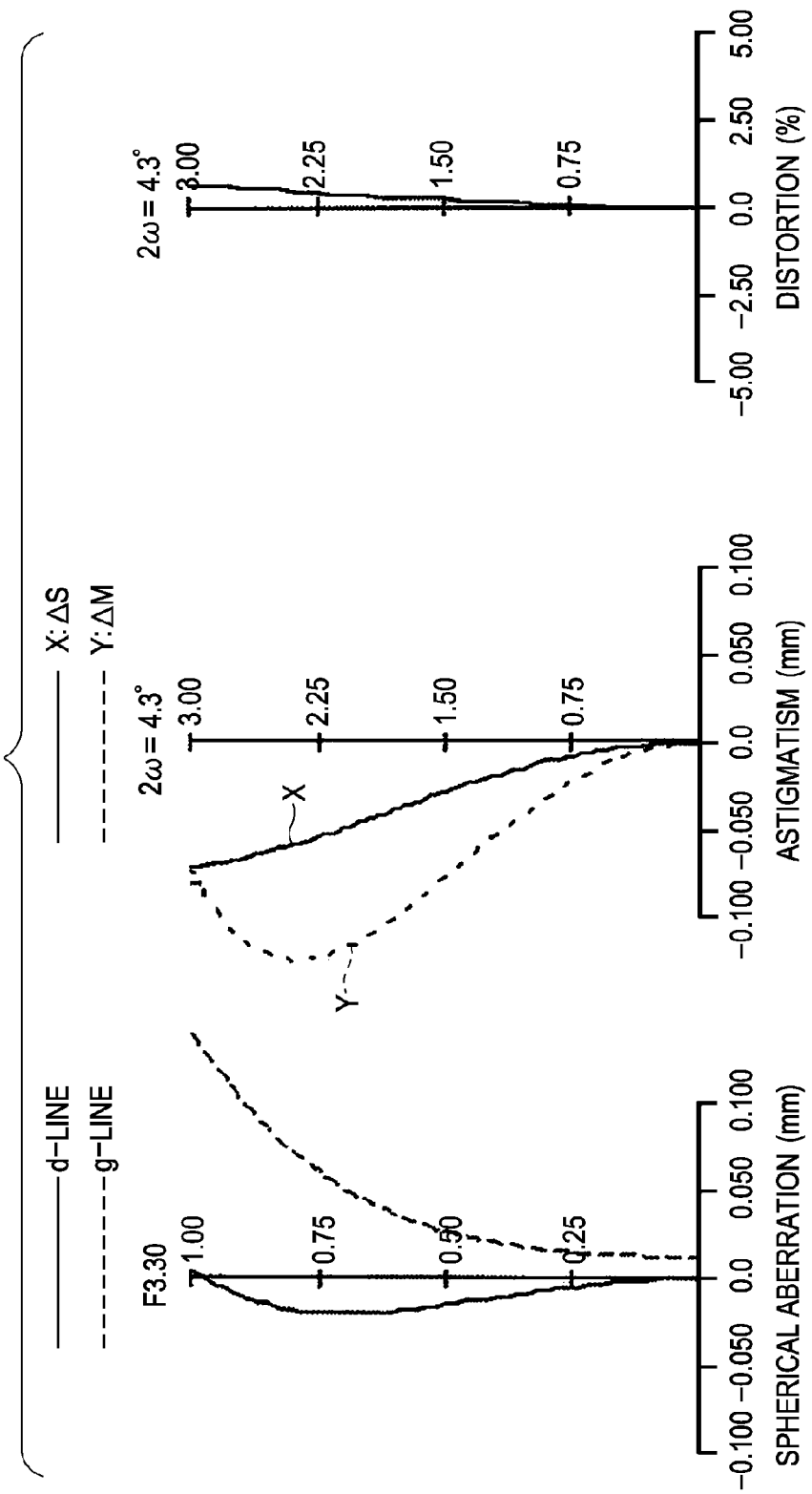
FIG. 4 includes diagrams showing aberrations occurring in the zoom lens of the first embodiment at a telephoto end.

FIG. 1 is a cross-sectional view of a zoom lens according to a first embodiment of the present invention at a wide-angle end (a short-focal-length end). FIGS. 2, 3, and 4 are diagrams showing aberrations occurring in the zoom lens of the first embodiment at the wide-angle end, at an intermediate zoom position, and at a telephoto end (a long-focal-length end), respectively.

Figure 5:
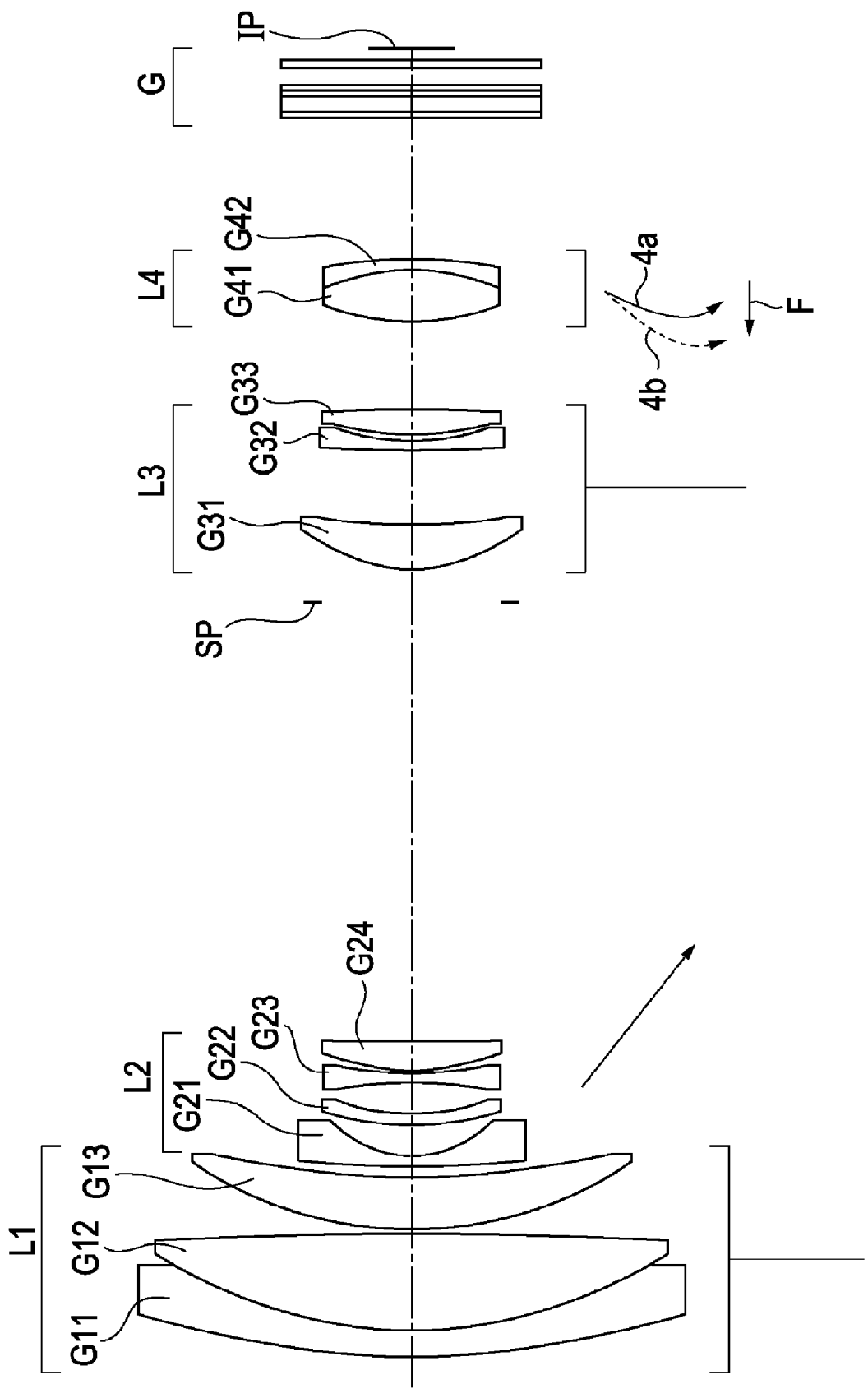
FIG. 5 is a cross-sectional view of a zoom lens according to a second embodiment of the present invention at a wide-angle end.
Figure 6:
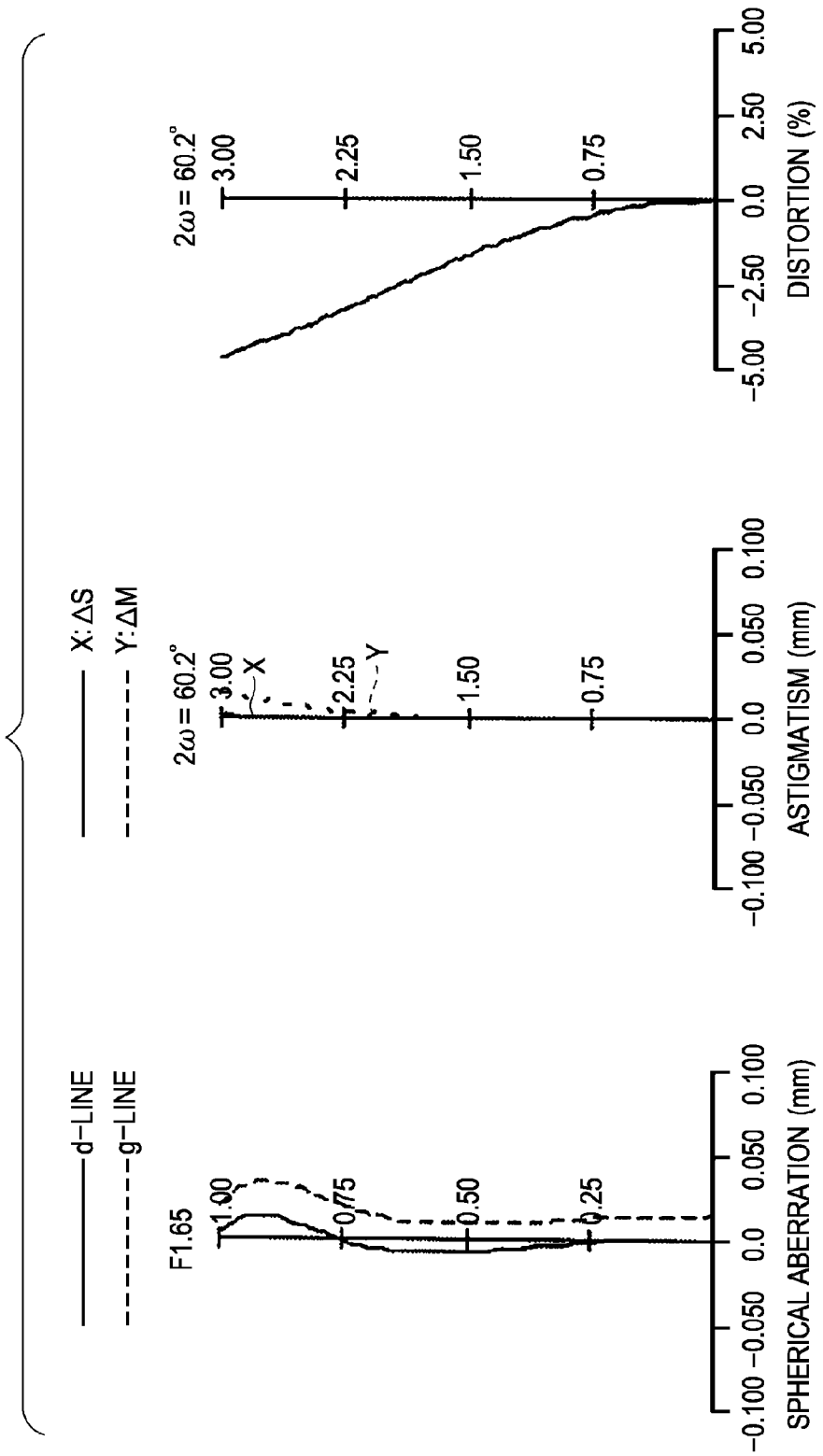
FIG. 6 includes diagrams showing aberrations occurring in the zoom lens of the second embodiment at the wide-angle end.
Figure 7:
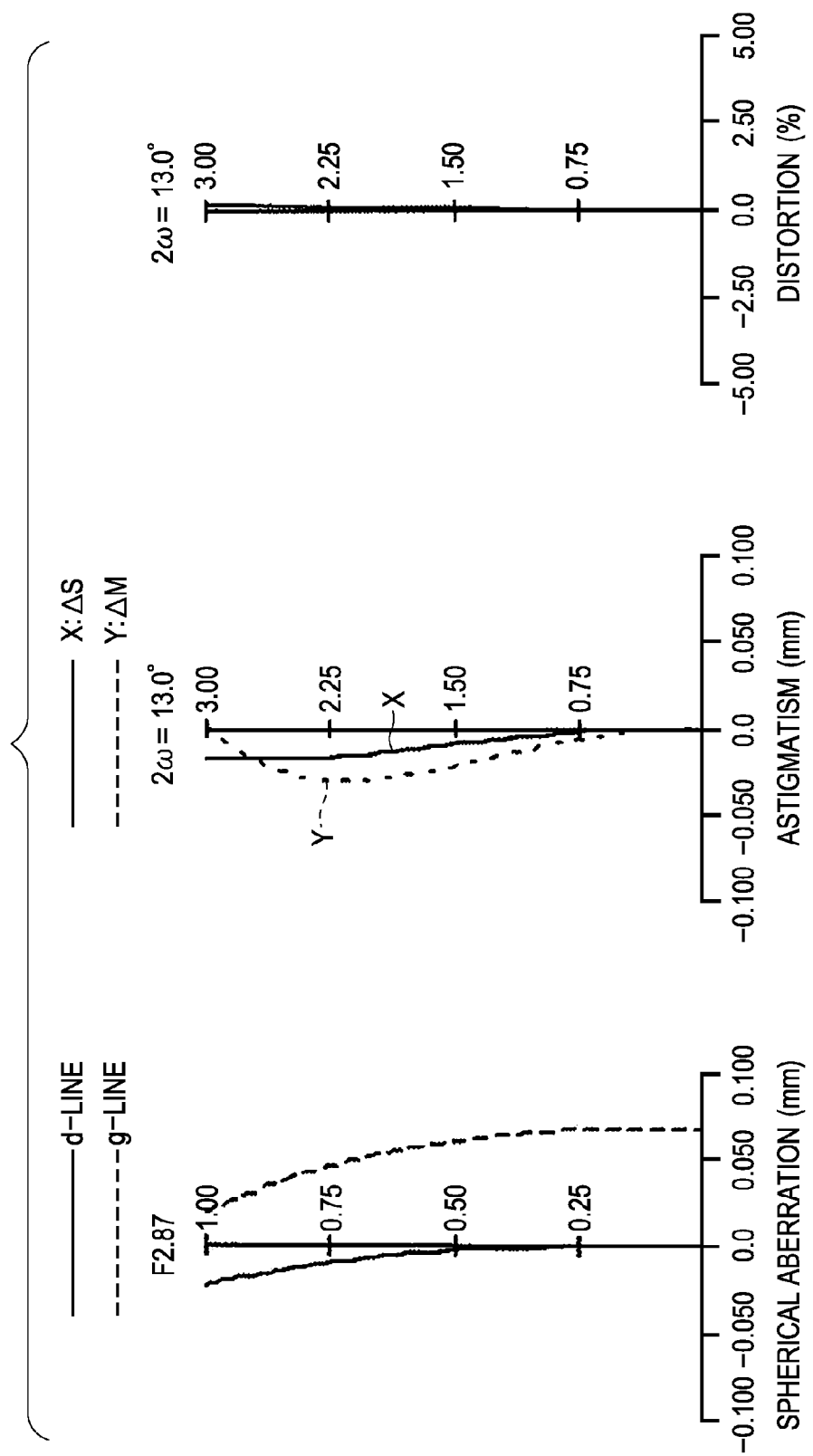
FIG. 7 includes diagrams showing aberrations occurring in the zoom lens of the second embodiment at an intermediate zoom position.
Figure 8:
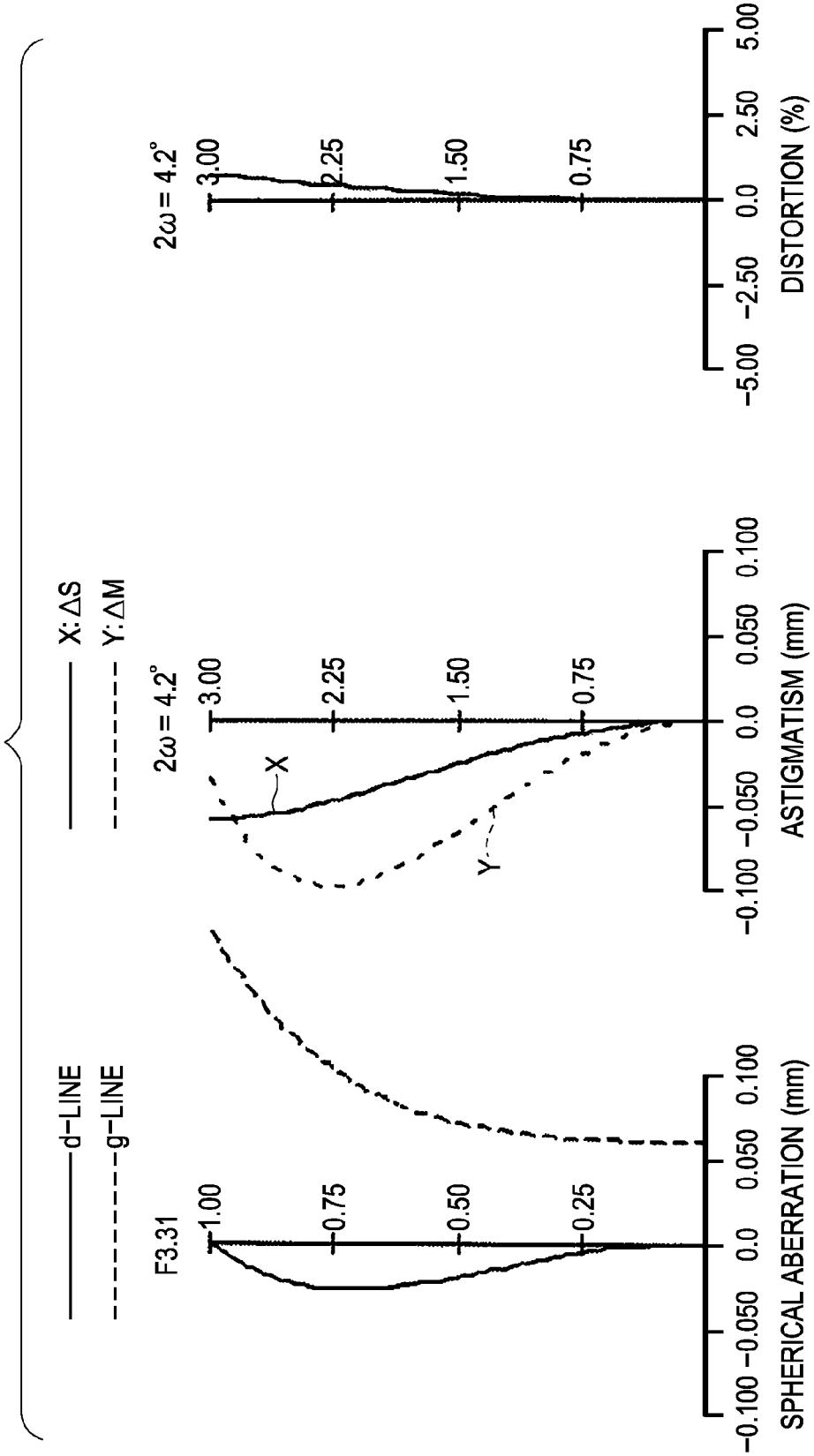
FIG. 8 includes diagrams showing aberrations occurring in the zoom lens of the second embodiment at a telephoto end.

FIG. 5 is a cross-sectional view of a zoom lens according to a second embodiment of the present invention at a wide-angle end. FIGS. 6, 7, and 8 are diagrams showing aberrations occurring in the zoom lens of the second embodiment at the wide-angle end, at an intermediate zoom position, and at a telephoto end, respectively.

Figure 9:
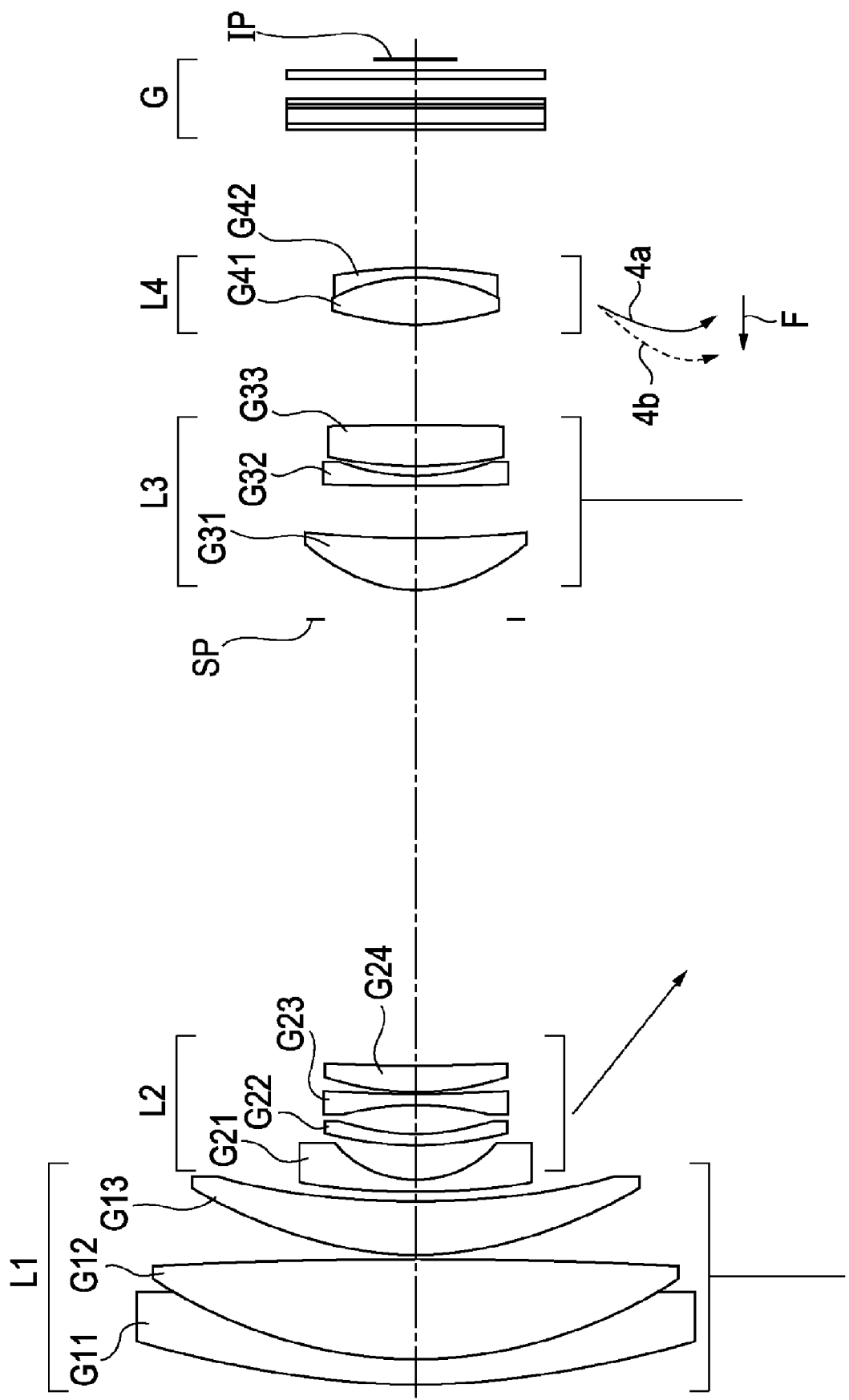
FIG. 9 is a cross-sectional view of a zoom lens according to a third embodiment of the present invention at a wide-angle end.
Figure 10:
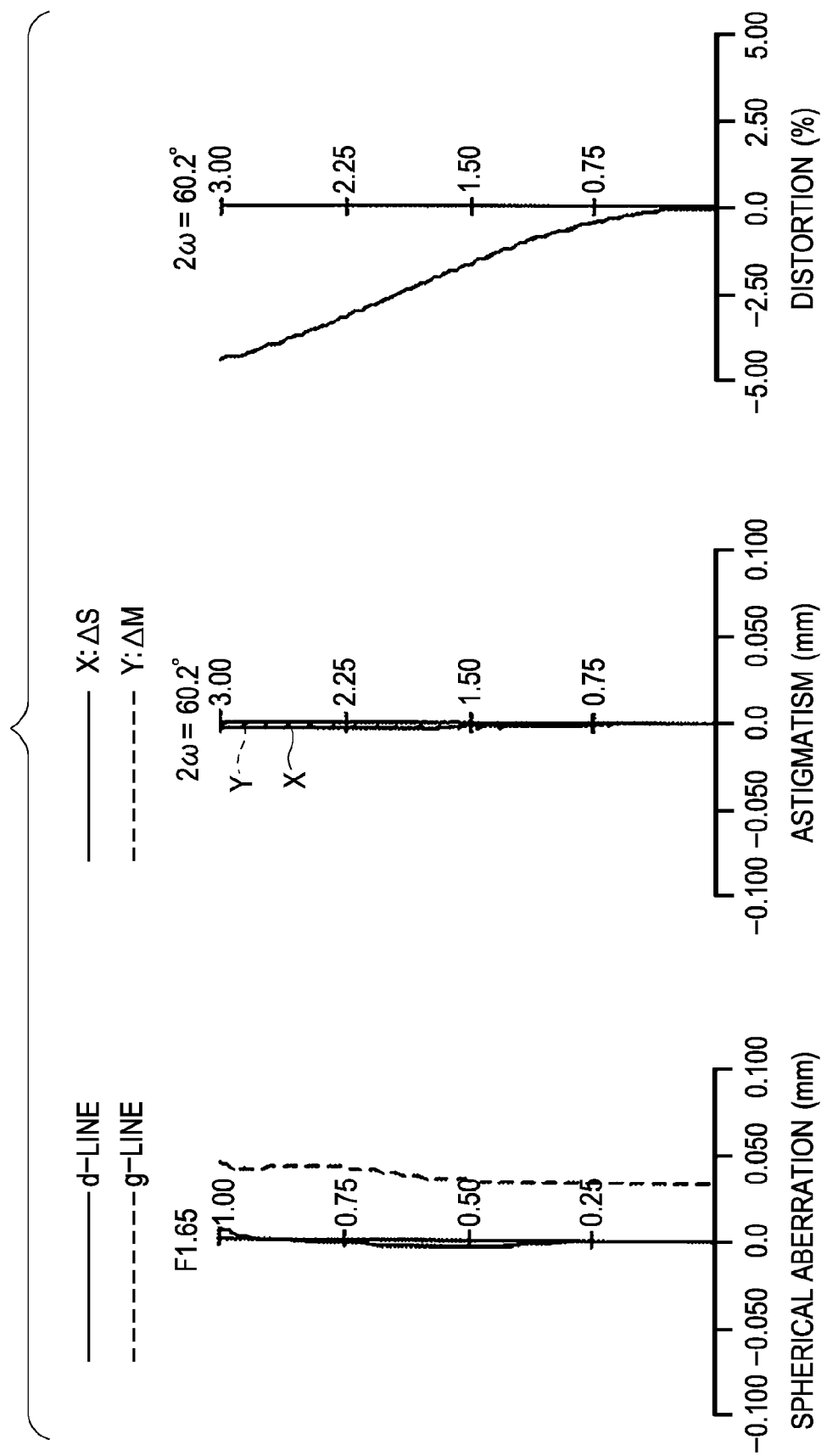
FIG. 10 includes diagrams showing aberrations occurring in the zoom lens of the third embodiment at the wide-angle end.
Figure 11:
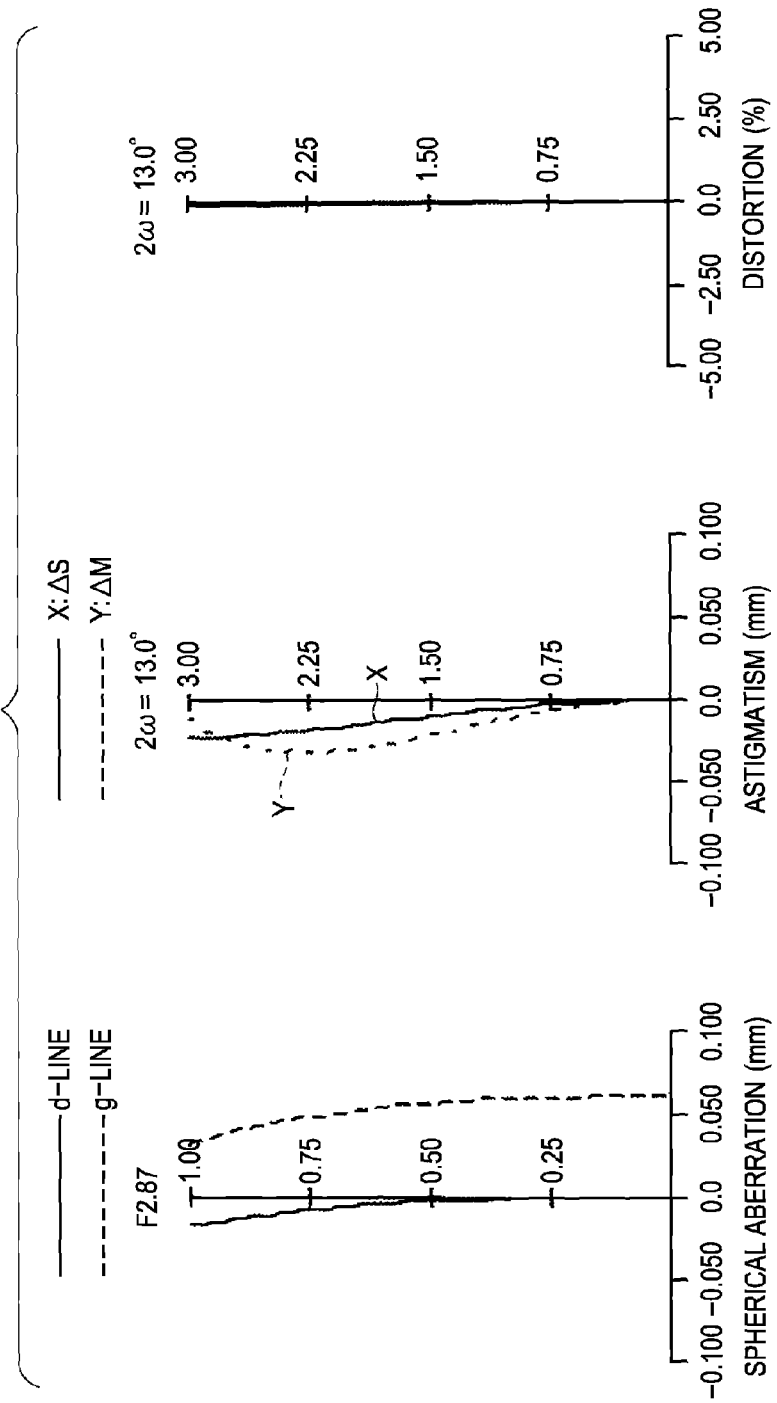
FIG. 11 includes diagrams showing aberrations occurring in the zoom lens of the third embodiment at an intermediate zoom position.
Figure 12:
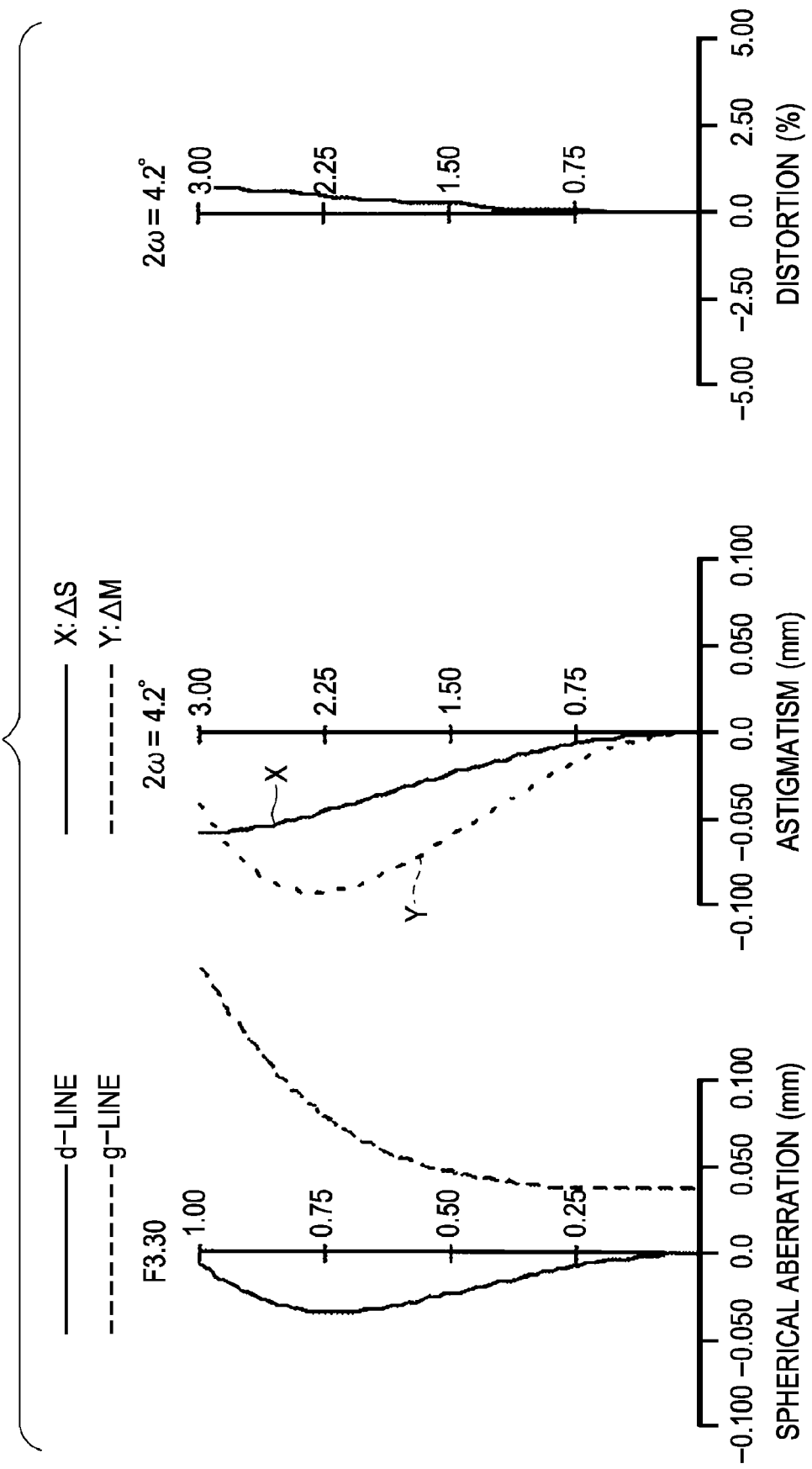
FIG. 12 includes diagrams showing aberrations occurring in the zoom lens of the third embodiment at a telephoto end.

FIG. 9 is a cross-sectional view of a zoom lens according to a third embodiment of the present invention at a wide-angle end. FIGS. 10, 11, and 12 are diagrams showing aberrations occurring in the zoom lens of the third embodiment at the wide-angle end, at an intermediate zoom position, and at a telephoto end, respectively.

Figure 13:
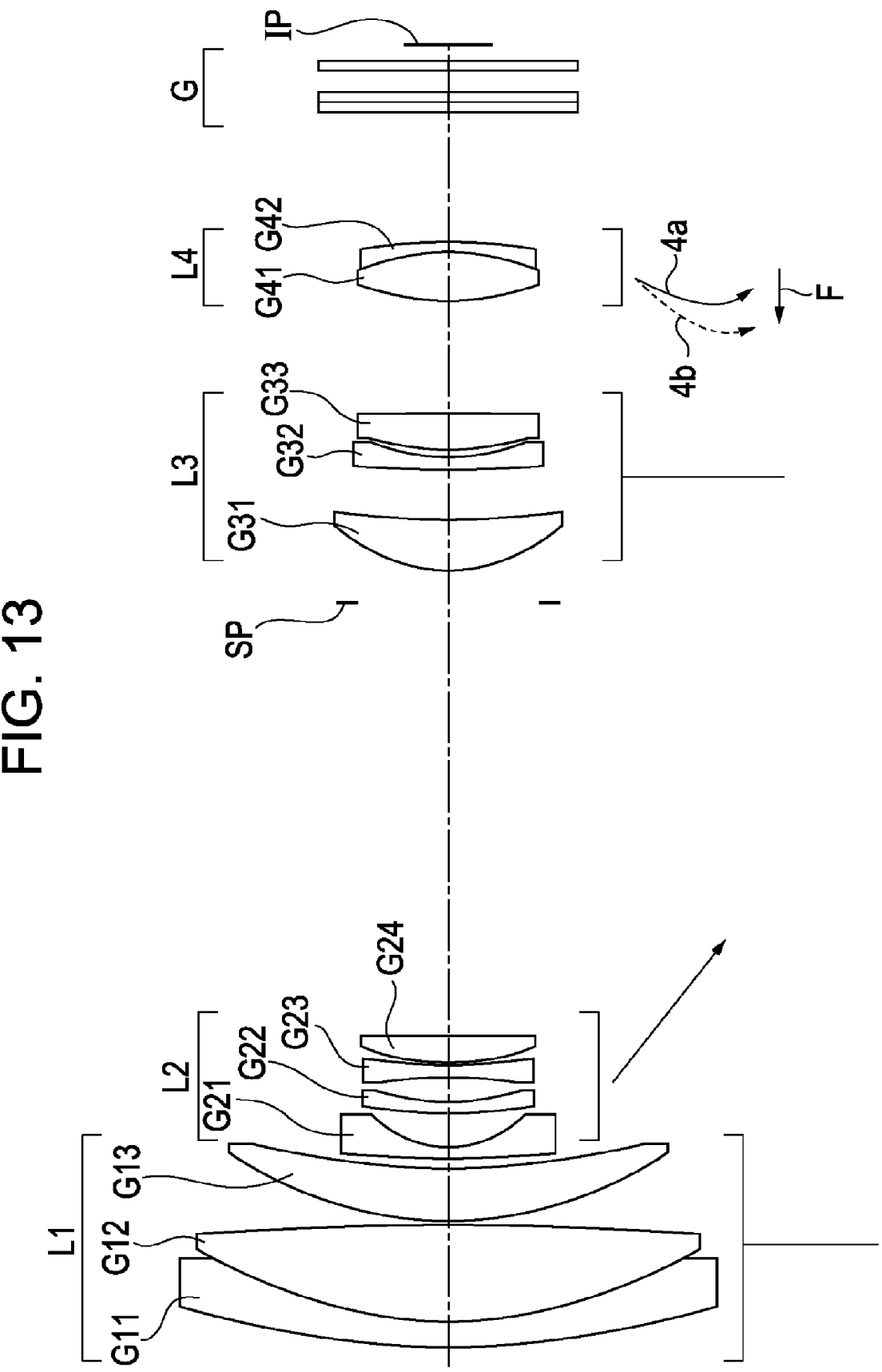
FIG. 13 is a cross-sectional view of a zoom lens according to a fourth embodiment of the present invention at a wide-angle end.
Figure 14:
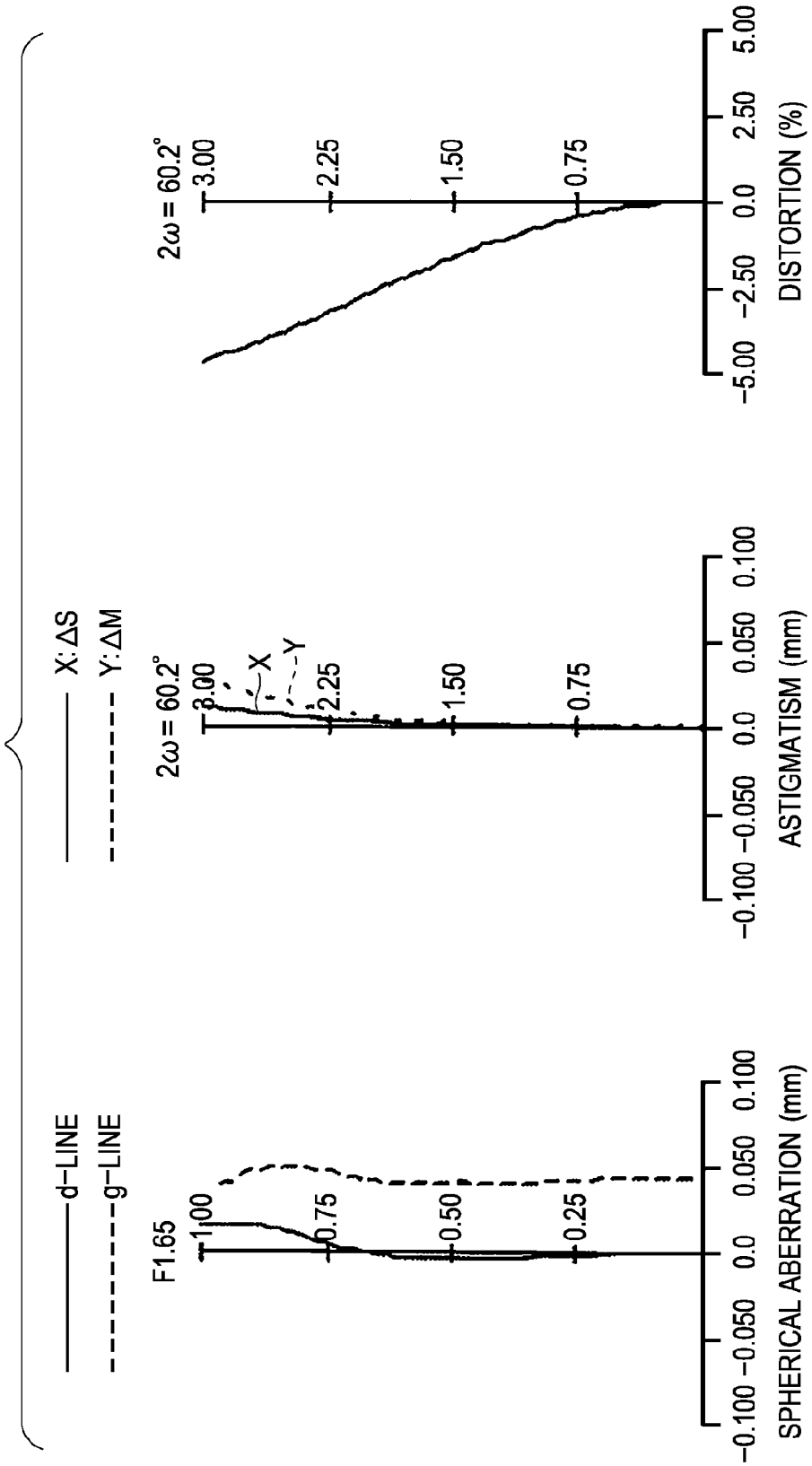
FIG. 14 includes diagrams showing aberrations occurring in the zoom lens of the fourth embodiment at the wide-angle end.
Figure 15:
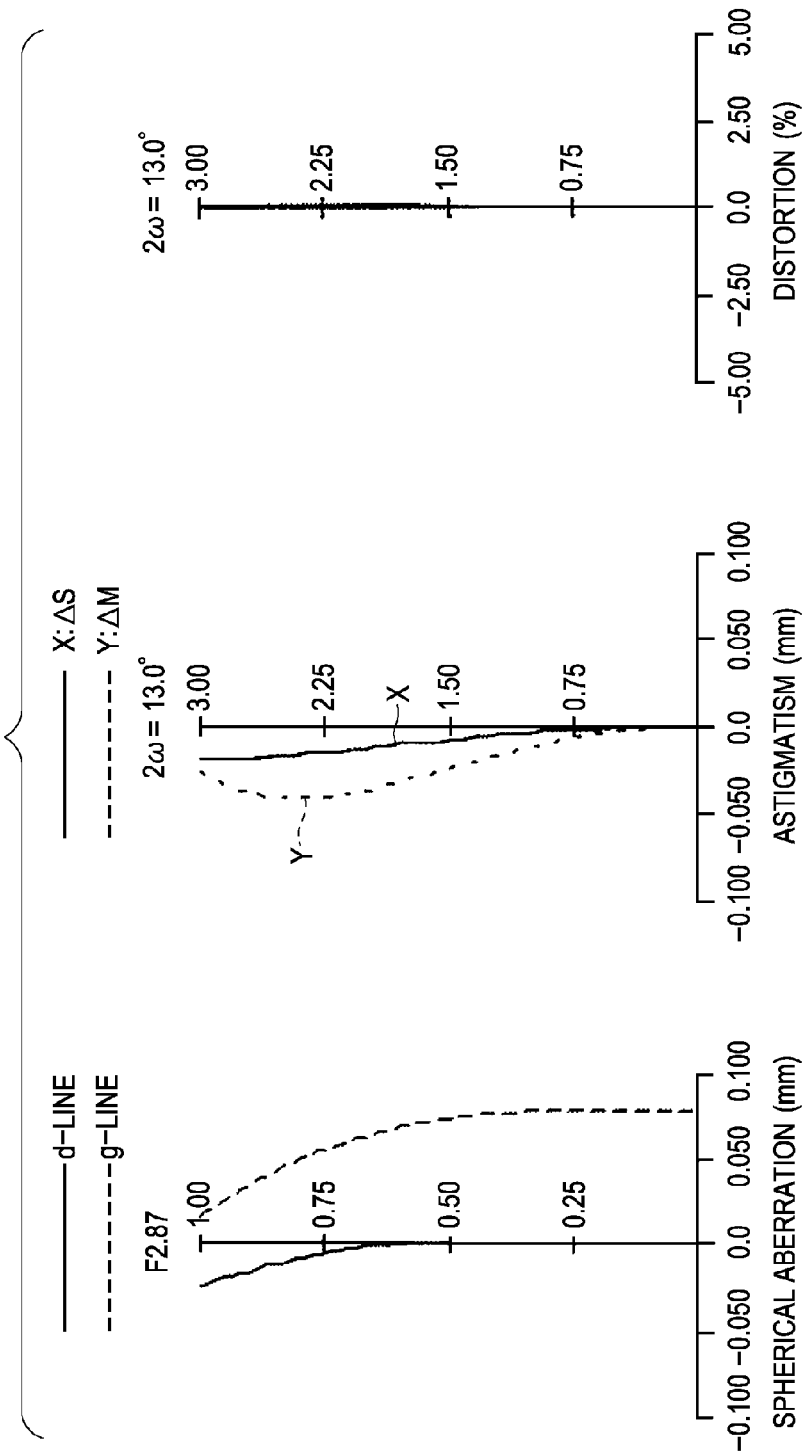
FIG. 15 includes diagrams showing aberrations occurring in the zoom lens of the fourth embodiment at an intermediate zoom position.
Figure 16:
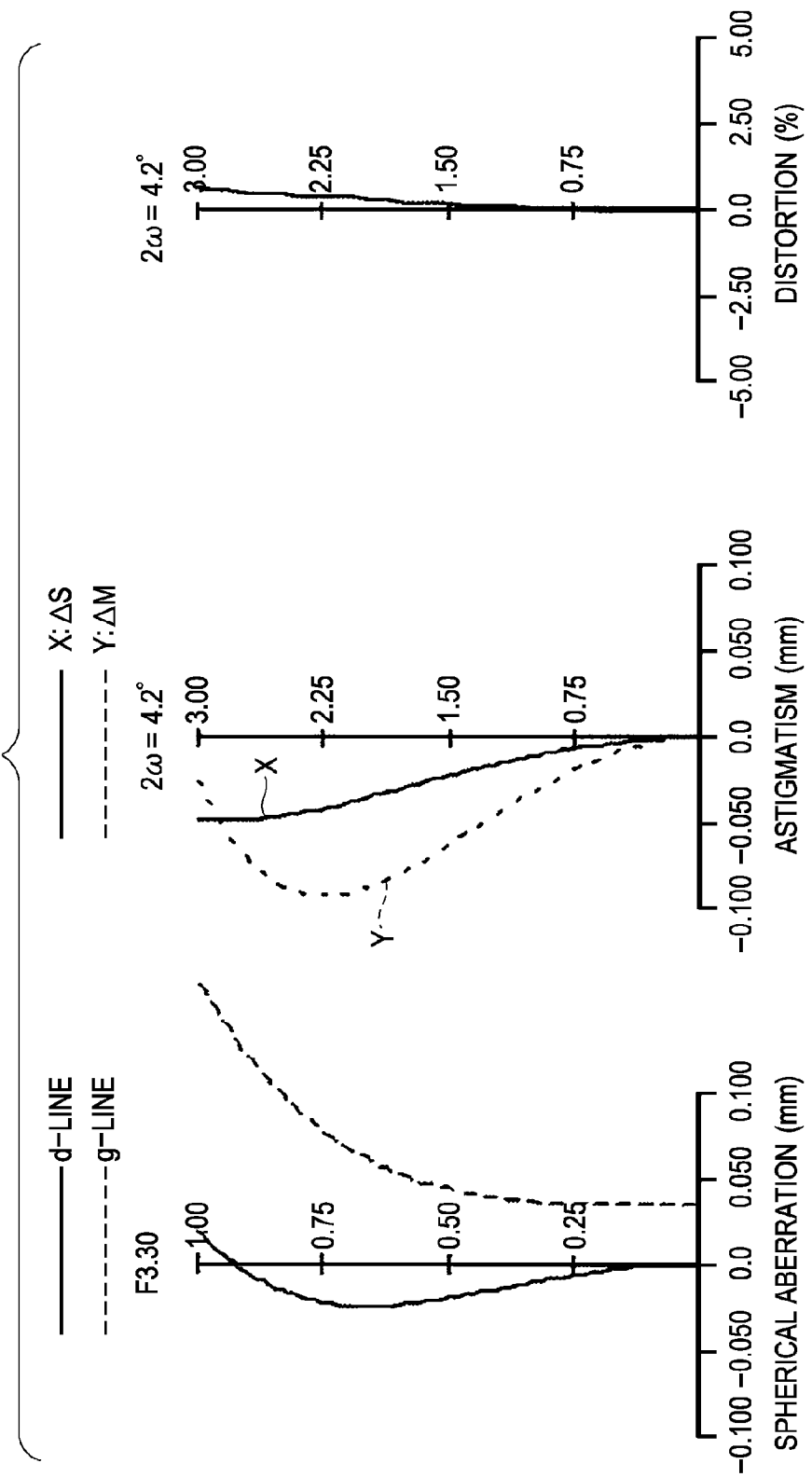
FIG. 16 includes diagrams showing aberrations occurring in the zoom lens of the fourth embodiment at a telephoto end.

FIG. 13 is a cross-sectional view of a zoom lens according to a fourth embodiment of the present invention at a wide-angle end. FIGS. 14, 15, and 16 are diagrams showing aberrations occurring in the zoom lens of the fourth embodiment at the wide-angle end, at an intermediate zoom position, and at a telephoto end, respectively.

Figure 17:
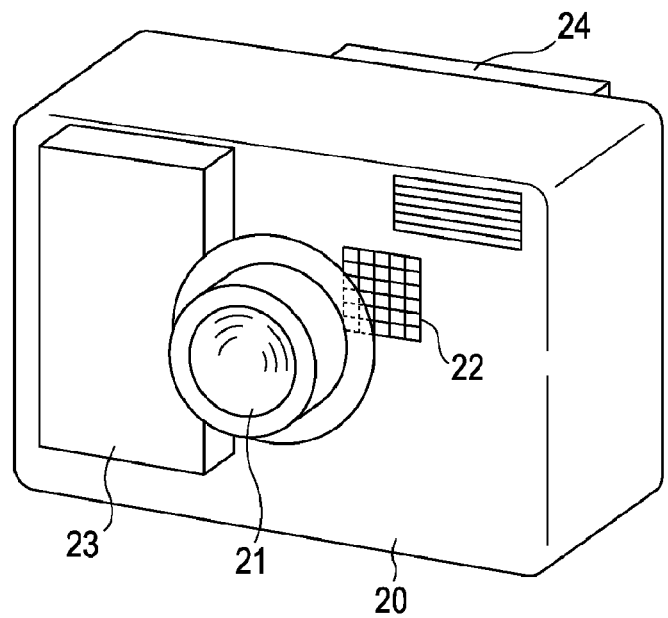
FIG. 17 schematically shows relevant parts of a digital camera to which the zoom lens according to any of the first to fourth embodiments of the present invention is applied.

FIG. 17 schematically shows relevant parts of a digital camera (an image pickup apparatus) that includes the zoom lens according to any of the first to fourth embodiments of the present invention.

Figure 18:
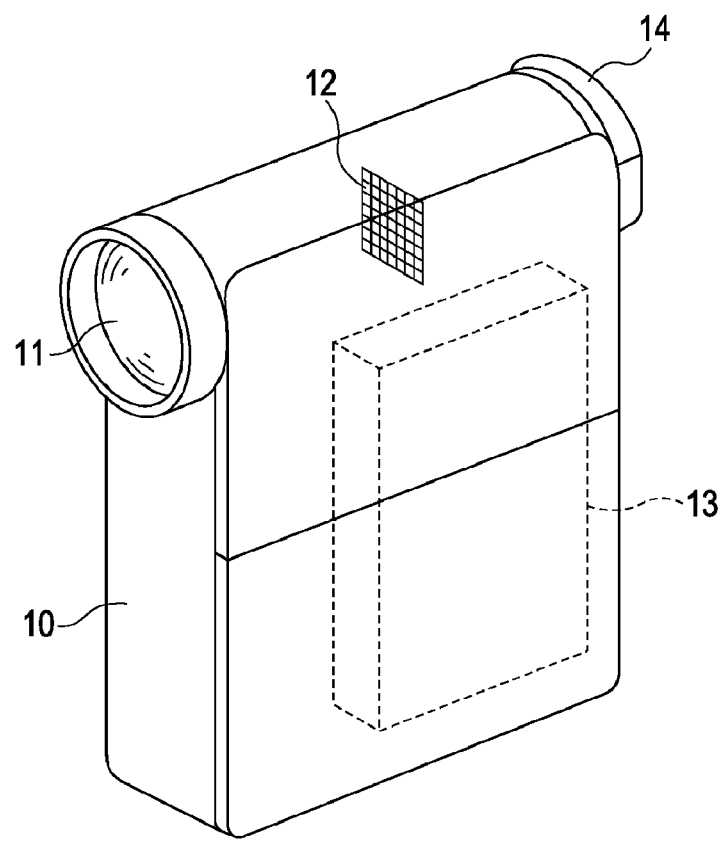
FIG. 18 schematically shows relevant parts of a video camera to which the zoom lens according to any of the first to fourth embodiments of the present invention is applied.

FIG. 18 schematically shows relevant parts of a video camera (an image pickup apparatus) that includes the zoom lens according to any of the first to fourth embodiments of the present invention.

The zoom lenses according to the first to fourth embodiments are image-taking optical systems included in image pickup apparatuses such as video cameras and digital still cameras. In each of the cross-sectional views, an object resides on the left (front) side, and an image is formed on the right (rear) side.

In a case where the zoom lens of each embodiment serves as a projection lens of a projector or the like, a screen resides on the left side, and an image is projected from the right side.

In each cross-sectional view, when the order of any lens unit counted from the object side is denoted by i, the i-th lens unit is denoted by Li.

In each of the cross-sectional views showing the first to fourth embodiments, L1 denotes a first lens unit having a positive refractive power (an optical power, i.e., the reciprocal of a focal length), L2 denotes a second lens unit having a negative refractive power, L3 denotes a third lens unit having a positive refractive power, and L4 denotes a fourth lens unit having a positive or negative refractive power.

When the order of any lens element included in each of the lens units is denoted by j, the j-th lens element included in the i-th lens unit Li is denoted by Gij.

Referring to each of the cross-sectional views showing the first to fourth embodiments, an aperture stop SP is positioned on the object side of the third lens unit L3.

An optical filter G is an optical block corresponding to a face plate or the like. An image plane IP corresponds to an image pickup surface of a solid-state image pickup device (a photoelectric conversion element) such as a charge-coupled-device (CCD) sensor or a complementary-metal-oxide-semiconductor (CMOS) sensor when the zoom lens is used as an image-taking optical system of a video camera or a digital camera, or a film surface when the zoom lens is used as an image-taking optical system of a silver-halide film camera.

In each of the aberration diagrams, d and g denote d-line and g-line, respectively, and $\Delta M$ and $\Delta S$ denote the meridional image plane and the sagittal image plane, respectively, F denotes the f-number, and $\omega$ denotes the half angle of view. While values of $2\omega$ are shown for astigmatism and distortion, the angle of view with respect to the optical axis is denoted by $\omega$.

In each of the embodiments, the wide-angle end and the telephoto end are zoom positions at extreme ends of a range in which the lens unit responsible for zooming (the second lens unit L2) can mechanically move along the optical axis.

The zoom lenses according to the first to fourth embodiments each include four lens units in order from the object side to the image side, specifically, a first lens unit L1 having a positive refractive power, a second lens unit L2 having a negative refractive power, a third lens unit L3 having a positive refractive power, and a fourth lens unit L4 having a positive refractive power.

Zooming from the wide-angle end to the telephoto end is performed by moving the second lens unit L2 toward the image side along a locus represented by an arrow.

Image-plane variation accompanying zooming is corrected by moving the fourth lens unit L4 along an appropriate portion of a locus convex toward the object side.

The zoom lenses according to the first to fourth embodiments are of a rear-focusing type in which focusing is performed by moving the fourth lens unit L4 along the optical axis. A solid curve 4a and a dotted curve 4b shown for the fourth lens unit L4 are loci along which the fourth lens unit L4 moves to correct image-plane variations accompanying zooming from the wide-angle end to the telephoto end, with the focus being on an object at infinity and on a near object, respectively.

To change the focus at, for example, the telephoto end from an object at infinity to a near object in each of the first to fourth embodiments, the fourth lens unit L4 is moved forward as represented by an arrow F.

In each of the first to fourth embodiments, the first lens unit L1, the third lens unit L3, and the aperture stop SP do not move for the purposes of zooming and focusing, but may be moved, according to need, for the purpose of aberration correction.

In each of the first to fourth embodiments, the second lens unit L2 includes at least three negative lens elements arranged successively and independently along the optical axis (the at least three negative lens elements are spaced apart from each other) and at least one positive lens element.

The third lens unit L3 includes a third first-positive-lens element G31 at the position nearest to an object-side end.

When the focal length of the zoom lens at the wide-angle end is denoted by fw; the focal lengths of the second and third lens units L2 and L3 are denoted by f2 and f3, respectively; and the focal length of the third first-positive-lens element G31, which is the lens element included in the third lens unit L3 nearest to the object-side end, is denoted by f31, the following conditional expressions are satisfied:

$$0.65 < f31/f3 < 1.05 \quad (1)$$

$$-1.80 < f2/fw < -1.35 \quad (2)$$

$$3.50 < f3/fw < 5.60 \quad (3)$$

Conditional Expressions (1) to (3) are intended for realizing a wide angle of view and good optical performance over the entire zoom range.

Conditional Expression (1) defines an appropriate refractive power of the third first-positive-lens element G31 with respect to the focal length, i.e., the refractive power, of the third lens unit L3.

If the upper limit of Conditional Expression (1) is exceeded and the focal length of the third first-positive-lens element G31 becomes large (the refractive power thereof becomes small), various aberrations are not corrected sufficiently, and the overall length, i.e., the overall size, of the zoom lens is disadvantageously increased.

If the lower limit of Conditional Expression (1) is exceeded and the focal length of the third first-positive-lens element G31 becomes small (the refractive power thereof becomes large), the amounts of various aberrations including spherical aberration disadvantageously become large, and it becomes difficult to suppress variations in such aberrations over the entire zoom range.

Conditional Expression (2) defines an appropriate refractive power of the second lens unit L2 with respect to the refractive power of the zoom lens at the wide angle end.

If the upper limit of Conditional Expression (2) is exceeded and the refractive power of the second lens unit L2 becomes large, the overall size of the zoom lens is advantageously reduced, whereas the Petzval sum becomes large negatively and the flatness of the image plane IP is disadvantageously deteriorated.

If the lower limit of Conditional Expression (2) is exceeded and the refractive power of the second lens unit L2 becomes small, the amount of travel of the second lens unit L2 becomes large so as to realize a desired zoom ratio, and the overall length of the zoom lens and the diameter of the most front lens element are disadvantageously increased.

Conditional Expression (3) defines an appropriate refractive power of the third lens unit L3 with respect to the refractive power of the zoom lens at the wide-angle end.

If the upper limit of Conditional Expression (3) is exceeded and the refractive power of the third lens unit L3 becomes small, the share of the refractive power assigned to the third lens unit L3 becomes advantageously small in terms of aberration correction. However, to suppress increase in the overall length of the zoom lens (the length from a first lens surface to the image plane IP), the power of the fourth lens unit L4 needs to be increased. Consequently, it becomes difficult to suppress aberration variations over the entire zoom range.

If the lower limit of Conditional Expression (3) is exceeded and the refractive power of the third lens unit L3 becomes large, the share of positive refractive power assigned to the third lens unit L3 becomes large, and it becomes difficult to realize good optical performance. Particularly, spherical aberration at the wide-angle end is worsened. Consequently, it becomes difficult to maintain a good balance of aberration correction over the entire zoom range.

In each of the embodiments, the ranges defined by Conditional Expressions (1) to (3) can be narrowed as follows:

$$0.75 < f31/f3 < 1.00 \quad (1a)$$

$$-1.60 < f2/fw < -1.40 \quad (2a)$$

$$3.9 < f3/fw < 5.0 \quad (3a)$$

The range defined by Conditional Expression (1a) can further be narrowed as follows:

$$0.785 < f31/f3 < 0.950 \quad (1b)$$

Each of the embodiments configured as above provides a zoom lens realizing a wide angle of view, with a half angle of view of about 30 degrees, and in which various aberrations are corrected well over the entire zoom range.

Furthermore, a rear-focusing zoom lens that realizes a large aperture ratio, specifically, an f-number of about 1.6 at the wide-angle end, is provided.

The zoom lens according to the present invention is realized if the conditions defined as above are satisfied. To realize much better optical performance while maintaining the high zoom ratio, it is desirable that at least one of conditions described below be satisfied.

Herein, the imaging magnifications of the second lens unit L2 at the wide-angle end and at the telephoto end are denoted by $\beta 2w$ and $\beta 2t$, respectively.

The radius of curvature of the object-side surface of the third first-positive-lens element G31, which is a meniscus lens element having a convex object-side surface and is positioned nearest to the object-side end in the third lens unit L3, is denoted by R31. The thickness (along the optical axis) of the third first-positive-lens element G31 is denoted by D31.

The Abbe number and the refractive index of a material composing the at least one positive lens element included in the second lens unit L2 are denoted by ν2p and N2p, respectively.

It is desirable that at least one of the following conditional expressions be satisfied:

$$18.0 < \beta 2t/\beta 2w < 40.0 \quad (4)$$

$$2.8 < R31/D31 < 5.0 \quad (5)$$

$$\nu 2p < 24.0 \quad (6)$$

$$1.82 < N2p \quad (7)$$

Conditional Expression (4) defines the range of variation in the imaging magnification of the second lens unit L2 occurring during zooming from the wide-angle end to the telephoto end. If the upper limit of Conditional Expression (4) is exceeded, the zoom ratio is advantageously increased, whereas it becomes difficult to correct various aberrations. If the lower limit of Conditional Expression (4) is exceeded, it becomes difficult to provide a desired zoom ratio (magnification).

The range defined by Conditional Expression (4) can be narrowed as follows:

$$20.0 < \beta 2t/\beta 2w < 28.0 \quad (4a)$$

Conditional Expression (5) defines the shape of the third first-positive-lens element G31 so that various aberrations are corrected well over the entire zoom range.

If the upper limit of Conditional Expression (5) is exceeded, the refractive power of the third first-positive-lens element G31 is reduced, and spherical aberration is not corrected sufficiently. If the lower limit of Conditional Expression (5) is exceeded, the balance of spherical aberration over the entire zoom range is lost.

The range defined by Conditional Expression (5) can be narrowed as follows:

$$3.0 < R31/D31 < 4.2 \quad (5a)$$

Conditional Expressions (6) and (7) define characteristics of the material composing the at least one positive lens element included in the second lens unit L2 responsible for zooming. If the upper limit of Conditional Expression (6) is exceeded, it becomes difficult to suppress variation in lateral chromatic aberration over the entire zoom range from the wide-angle end to the telephoto end.

If the lower limit of Conditional Expression (7) is exceeded, the principal point of the second lens unit L2 shifts toward the image side, and the diameter of the most front lens element is increased. Consequently, it becomes difficult to reduce the overall size of the zoom lens.

The ranges defined by Conditional Expressions (6) and (7) can be narrowed as follows:

$$\nu 2p < 20.0 \quad (6a)$$

$$1.90 < N2p \quad (7a)$$

In general, to realize a zoom lens with a wide angle of view, the power (refractive power) of a negative lens element (or a negative lens unit) positioned near the object-side end needs to be increased. Therefore, to reduce the size of a zoom lens including four lens units having positive, negative, positive, and positive refractive powers, respectively, by suppressing increase in the effective diameter of the zoom lens while increasing the angle of view, it is advantageous that the second lens unit L2 have an increased negative refractive power.

In this respect, each of the embodiments employs a configuration in which the second lens unit L2 includes at least three negative lens elements arranged in order from the object side to the image side. Thus, a wide angle of view is realized.

If the second lens unit L2 includes only negative lens elements, variations in aberrations become large. Therefore, the second lens unit L2 also includes at least one positive lens element, whereby the power of the second lens unit L2 is balanced in its entirety.

Furthermore, by successively arranging at least three negative lens elements in order from the object side to the image side in the second lens unit L2, it becomes easy to reduce the overall size of the zoom lens while realizing a wide angle of view and suppressing, as much as possible, increase in the size of the second lens unit L2.

Specifically, the second lens unit L2 has, in order from the object side to the image side, no more than two meniscus negative lens elements each having a convex object-side surface, a biconcave negative lens element, and a positive lens element having a convex object-side surface.

Thus, the advantageous effects described above are obtained.

The third lens unit L3 has, in order from the object side to the image side, no more than the third first-positive-lens element G31 having an aspherical surface, a third second-negative-lens element G32, and a third third-positive-lens element G33 having an aspherical surface.

With the third lens unit L3 having such a configuration, spherical aberration and longitudinal chromatic aberration at the wide-angle end and field curvature over the entire zoom range from the wide-angle end to the telephoto end are corrected well.

With the positive lens elements of the third lens unit L3 being arranged nonsuccessively and each having one of the surfaces being aspherical, spherical aberration and coma are corrected effectively.

If the positive lens elements are arranged successively with a sufficient gap provided therebetween, the same advantageous effect is obtained in terms of aberration correction, but the overall length of the zoom lens is disadvantageously increased.

With the third first-positive-lens element G31 being provided at the position nearest to the object-side end, the third lens unit L3 corrects spherical aberration, mainly, occurring in the second lens unit L2.

The convex object-side surface of the third first-positive-lens element G31 makes it easy to correct aberrations at a position near the aperture stop SP, with which the f-number is determined. Accordingly, an appropriate power is provided to the third-first positive lens element G31, and much better optical performance is realized.

Particularly, since on-axis rays significantly affects optical performance, it becomes easy to effectively reduce spherical aberration by providing an appropriate power to a surface (the object-side surface of the third-first positive lens element G31) near the aperture stop SP (where on-axis rays are gathered). In addition, since the surface in the third lens unit L3 nearest to the object-side end has a convex aspherical shape, aberrations are corrected more effectively.

The first lens unit L1 has no more than a cemented lens in which a meniscus first first-negative-lens element G11 having a convex object-side surface and a first second-positive-lens element G12 are cemented together, and a meniscus first third-positive-lens element G13 having a convex object-side surface.

Thus, chromatic aberration and spherical aberration are corrected well.

The fourth lens unit L4 has no more than a cemented lens in which a biconvex positive lens element and a negative lens element are cemented together.

Thus, variations in aberrations occurring during focusing with the fourth lens unit L4 are suppressed.

Individual configurations of the first to fourth embodiments will now be described. The components will be described in order from the object side to the image side, unless otherwise stated.

First Embodiment (FIG. 1)

The first lens unit L1 has no more than a meniscus first first-negative-lens element G11 having a convex object-side surface, a biconvex first second-positive-lens element G12, and a meniscus first third-positive-lens element G13 having a convex object-side surface.

Thus, various aberrations occurring in the first first-negative-lens element G11 are corrected by the first second-positive-lens element G12 and the first third-positive-lens element G13.

The second lens unit L2 has no more than a meniscus second first-negative-lens element G21 having a convex object-side surface, a meniscus second second-negative-lens element G22 having a convex object-side surface, a biconcave second third-negative-lens element G23, and a meniscus second fourth-positive-lens element G24 having a convex object-side surface.

The third lens unit L3 has no more than a meniscus third first-positive-lens element G31 having a convex object-side surface, a meniscus third second-negative-lens element G32 having a convex object-side surface, and a biconvex third third-positive-lens element G33.

Since the object-side surfaces of the third first-positive-lens element G31 and the third third-positive-lens element G33 are aspherical, spherical aberration at the wide-angle end and other aberrations over the entire zoom range are corrected effectively.

At least one of the surfaces of each of the third first-positive-lens element G31 and the third third-positive-lens element G33 is aspherical. Thus, while various aberrations are corrected well, light from the second lens unit L2 is prevented from diverging too much when emitted through the third lens unit L3 (so that the size of the fourth lens unit L4 is not increased).

The fourth lens unit L4 has no more than a cemented lens in which a biconvex fourth first-positive lens element G41 and a meniscus fourth second-negative-lens element G42 having a convex image-side surface are cemented together.

With the cemented lens in the fourth lens unit L4, longitudinal and lateral chromatic aberrations over the entire zoom range are corrected well.

Second Embodiment (FIG. 5)

The first lens unit L1 has the same configuration as in the first embodiment.

The second lens unit L2 has no more than a meniscus second first-negative-lens element G21 having a convex object-side surface, a meniscus second second-negative-lens element G22 having a convex object-side surface, a biconcave second third-negative-lens element G23, and a biconvex second fourth-positive-lens element G24.

The third lens unit L3 has the same configuration as in the first embodiment.

The fourth lens unit L4 has the same configuration as in the first embodiment.

Third Embodiment (FIG. 9)

The third embodiment employs the same configuration as in the first embodiment.

Fourth Embodiment (FIG. 13)

The first lens unit L1 has the same configuration as in the first embodiment.

The second lens unit L2 has no more than a meniscus second first-negative-lens element G21 having a convex object-side surface, a meniscus second second-negative-lens element G22 having a convex object-side surface, a biconcave second third-negative-lens element G23, and a biconvex second fourth-positive-lens element G24.

The third lens unit L3 has no more than a meniscus third first-positive-lens element G31 having a convex object-side surface, a meniscus third second-negative-lens element G32 having a convex object-side surface, and a biconvex third third-positive-lens element G33.

The surfaces of the third first-positive-lens element G31 on both sides and the surfaces of the third third-positive-lens element G33 on both sides are aspherical. Thus, spherical aberration at the wide-angle end and other aberrations over the entire zoom range are corrected effectively.

While various aberrations are corrected well with all the surfaces of the third first-positive-lens element G31 and the third third-positive-lens element G33 being aspherical, light from the second lens unit L2 is prevented from diverging too much when emitted through the third lens unit L3 (so that the size of the fourth lens unit L4 is not increased).

The fourth lens unit L4 has the same configuration as in the first embodiment.

In each of the first to fourth embodiments, to further suppress chromatic aberration occurring in the first lens unit L1, the first second-positive-lens element G12 may be made of ultra-low-dispersion glass. Exemplary products of such a material include S-FPL51 and S-FPL53 manufactured by OHARA.

While the aperture stop SP is positioned on the object side of the third lens unit L3 in each of the embodiments, the aperture stop SP may be provided at any position in the optical path. For example, the aperture stop SP may be provided within the third lens unit L3 or on the image side of the third lens unit L3. Moreover, the aperture stop SP may be moved during zooming independently from the lens units.

In a case where the zoom lens according to any of the embodiments is applied to an image pickup apparatus, an electrical correction unit configured to electrically correct various aberrations including distortion occurring in the zoom lens may be added.

The lens elements having aspherical surfaces are not limited to be made of glass, and may be aspherical lens elements of a hybrid type in which an aspherical surface is formed by providing a resin material (by adding an aspherical component) on a surface of a spherical lens element made of glass, or may be plastic-molded aspherical lens elements.

Some of the lens elements and lens units may be moved in directions each containing a component perpendicular to the optical axis so that the image can be shifted in a direction perpendicular to the optical axis, whereby image blur due to vibrations caused by hand shake or the like may be corrected.

Thus, each of the embodiments provides a zoom lens whose overall size is small and having a wide angle of view, with a half angle of view of about 30 degrees, and high optical performance over the entire zoom range.

In addition, each of the embodiments produces advantageous effects described below.

By employing a rear-focusing method with the lens units having the respective configurations described above, good optical performance is realized over the entire zoom range from the wide-angle end to the telephoto end even with a reduced overall size of the zoom lens.

Since the first lens unit L1 is not moved for the purpose of zooming, the mechanical configuration is simplified.

With the second lens unit L2 configured as described above, high optical performance is realized over the entire zoom range, and a large aperture ratio, specifically, an f-number of about 1.6 at the wide-angle end, is realized.

Numerical examples corresponding to the first to fourth embodiments will now be provided. In each of the numerical examples, i denotes the order of the lens surface counted from the object side, Ri denotes the radius of curvature of the i-th surface, di denotes the gap between the i-th surface and the (i+1)-th surface, and Ni and vi denote the refractive index and the Abbe number, respectively, with respect to d-line. Coefficients of aspherical surfaces are denoted by k, B, C, D, and E.

When the displacement along the optical axis at a height h from the optical axis with respect to the surface vertex is denoted by x, the shape of an aspherical surface is expressed as follows:

$$x = (h^2/R)/[1+\{1-(1+k)(h/R)^2\}^{1/2}] + Bh^4 + Ch^6 + Dh^8 + Eh^{10}$$

where R denotes the paraxial radius of curvature. An expression "e-Z", for example, represents "$10^{-Z}$".

The five surfaces nearest to an image-side end in each of Numerical Examples 1 and 4 and the seven surfaces nearest to the image-side end in each of Numerical Examples 2 and 3 correspond to glass blocks.

Relationships between Conditional Expressions (1) to (7) and Numerical Examples 1 to 4 are summarized in Table 1.

NUMERICAL EXAMPLE 1

| i | Ri | di | Ni | vi |
|---|---|---|---|---|
| 1 | 55.155 | 1.600 | 1.84666 | 23.8 |
| 2 | 28.978 | 6.150 | 1.60311 | 60.6 |
| 3 | −396.314 | 0.170 | | |
| 4 | 25.337 | 3.500 | 1.69680 | 55.5 |
| 5 | 62.366 | (Variable) | | |
| 6 | 62.322 | 0.750 | 1.88300 | 40.8 |
| 7 | 7.208 | 1.739 | | |
| 8 | 16.946 | 0.700 | 1.83400 | 37.2 |
| 9 | 10.392 | 2.230 | | |
| 10 | −19.900 | 0.650 | 1.72000 | 50.2 |
| 11 | 59.661 | 0.143 | | |
| 12 | 16.530 | 1.750 | 1.92286 | 18.9 |
| 13 | 3370.896 | (Variable) | | |
| 14 | (Stop) | 1.650 | | |

-continued

| i | Ri | di | Ni | vi |
|---|---|---|---|---|
| 15* | 11.714 | 2.950 | 1.69350 | 53.2 |
| 16 | 77.864 | 2.910 | | |
| 17 | 84.521 | 0.600 | 1.84666 | 23.8 |
| 18 | 16.567 | 0.452 | | |
| 19* | 23.342 | 2.500 | 1.58313 | 59.4 |
| 20 | −100.078 | (Variable) | | |
| 21 | 20.982 | 3.000 | 1.65844 | 50.9 |
| 22 | −10.806 | 0.600 | 1.84666 | 23.8 |
| 23 | −25.367 | (Variable) | | |
| 24 | ∞ | 0.700 | 1.51400 | 70.0 |
| 25 | ∞ | 0.700 | 1.51633 | 64.1 |
| 26 | ∞ | 2.600 | | |
| 27 | ∞ | 0.700 | 1.50000 | 60.0 |
| 28 | ∞ | | | |

Coefficients of Aspherical Surfaces

| | K | B | C | D | E |
|---|---|---|---|---|---|
| 15* | −1.00E+00 | 6.56E−05 | 2.22E−07 | 3.28E−09 | −5.66E−12 |
| 19* | 3.41E−01 | −1.71E−04 | −6.88E−07 | −1.13E−08 | 0.00E+00 |

Other Data, with Zoom Ratio of 15.6

| | Wide-angle | Intermediate | Telephoto |
|---|---|---|---|
| Focal length | 5.16 | 26.09 | 80.75 |
| F-number | 1.65 | 2.87 | 3.30 |
| Half angle of view | 30.17 | 6.56 | 2.13 |
| Image height | 3.00 | 3.00 | 3.00 |
| Overall length | 79.9 | 79.9 | 79.9 |
| BF | 11.97 | 16.83 | 8.57 |

| Gap | Wide-angle | Intermediate | Telephoto |
|---|---|---|---|
| d5 | 0.711 | 19.448 | 26.031 |
| d13 | 26.830 | 8.093 | 1.510 |
| d20 | 6.356 | 2.300 | 10.559 |
| d23 | 6.600 | 10.655 | 2.397 |

NUMERICAL EXAMPLE 2

| i | Ri | di | Ni | vi |
|---|---|---|---|---|
| 1 | 61.067 | 1.600 | 1.84666 | 23.8 |
| 2 | 30.297 | 6.002 | 1.60311 | 60.6 |
| 3 | −215.921 | 0.200 | | |
| 4 | 25.275 | 3.311 | 1.71300 | 53.9 |
| 5 | 59.018 | (Variable) | | |
| 6 | 73.408 | 0.750 | 1.88300 | 40.8 |
| 7 | 7.171 | 1.938 | | |
| 8 | 23.003 | 0.700 | 1.84666 | 23.8 |
| 9 | 13.279 | 1.926 | | |
| 10 | −24.043 | 0.650 | 1.77250 | 49.6 |
| 11 | 37.971 | 0.108 | | |
| 12 | 16.471 | 1.805 | 1.92286 | 18.9 |

-continued

| i | Ri | di | Ni | vi |
|---|---|---|---|---|
| 13 | −181.572 | (Variable) | | |
| 14 | (Stop) | 2.050 | | |
| 15* | 10.833 | 2.771 | 1.69350 | 53.2 |
| 16 | 34.423 | 4.665 | | |
| 17 | 124.516 | 0.600 | 1.84666 | 23.8 |
| 18 | 16.229 | 0.406 | | |
| 19* | 17.535 | 1.511 | 1.58313 | 59.4 |
| 20 | −121.944 | (Variable) | | |
| 21 | 17.004 | 3.154 | 1.63854 | 55.4 |
| 22 | −14.321 | 0.600 | 1.84666 | 23.8 |
| 23 | −33.896 | (Variable) | | |
| 24 | ∞ | 0.310 | 1.54400 | 60.0 |
| 25 | ∞ | 1.000 | 1.51400 | 70.0 |
| 26 | ∞ | 0.260 | 1.54400 | 60.0 |
| 27 | ∞ | 0.310 | 1.54400 | 60.0 |
| 28 | ∞ | 1.154 | | |
| 29 | ∞ | 0.500 | 1.49000 | 70.0 |
| 30 | ∞ | | | |

Coefficients of Aspherical Surfaces

| | K | B | C | D | E |
|---|---|---|---|---|---|
| 15* | −8.54E−01 | 6.18E−05 | 2.66E−07 | 1.06E−09 | 4.55E−11 |
| 19* | −1.37E+00 | −1.56E−04 | −6.64E−07 | −2.44E−08 | 0.00E+00 |

Other Data, with Zoom Ratio of 15.8

| | Wide-angle | Intermediate | Telephoto |
|---|---|---|---|
| Focal length | 5.18 | 26.36 | 81.78 |
| F-number | 1.65 | 2.87 | 3.31 |
| Half angle of view | 30.10 | 6.49 | 2.10 |
| Image height | 3.00 | 3.00 | 3.00 |
| Overall length | 80.2 | 80.2 | 80.2 |
| BF | 12.22 | 16.23 | 7.67 |

| Gap | Wide-angle | Intermediate | Telephoto |
|---|---|---|---|
| d5 | 0.600 | 19.646 | 26.338 |
| d13 | 27.118 | 8.072 | 1.380 |
| d20 | 5.486 | 1.473 | 10.033 |
| d23 | 8.782 | 12.796 | 4.235 |

NUMERICAL EXAMPLE 3

| i | Ri | di | Ni | vi |
|---|---|---|---|---|
| 1 | 62.395 | 1.600 | 1.84666 | 23.8 |
| 2 | 30.480 | 6.051 | 1.60311 | 60.6 |
| 3 | −207.268 | 0.200 | | |
| 4 | 25.255 | 3.306 | 1.71300 | 53.9 |
| 5 | 58.693 | (Variable) | | |
| 6 | 62.427 | 0.750 | 1.88300 | 40.8 |
| 7 | 7.066 | 2.034 | | |
| 8 | 23.199 | 0.700 | 1.88300 | 40.8 |
| 9 | 14.959 | 1.789 | | |
| 10 | −20.195 | 0.650 | 1.71300 | 53.9 |
| 11 | 50.432 | 0.091 | | |
| 12 | 16.950 | 1.666 | 1.92286 | 18.9 |
| 13 | 1486.433 | (Variable) | | |
| 14 | (Stop) | 1.950 | | |
| 15* | 10.531 | 3.036 | 1.69350 | 53.2 |
| 16 | 45.790 | 3.186 | | |

-continued

| i | Ri | di | Ni | vi |
|---|---|---|---|---|
| 17 | 177.963 | 0.600 | 1.84666 | 23.8 |
| 18 | 15.765 | 0.595 | | |
| 19* | 19.774 | 2.500 | 1.58313 | 59.4 |
| 20 | −135.888 | (Variable) | | |
| 21 | 17.521 | 2.878 | 1.65844 | 50.9 |
| 22 | −12.281 | 0.600 | 1.84666 | 23.8 |
| 23 | −30.482 | (Variable) | | |
| 24 | ∞ | 0.310 | 1.54400 | 60.0 |
| 25 | ∞ | 1.000 | 1.51400 | 70.0 |
| 26 | ∞ | 0.260 | 1.54400 | 60.0 |
| 27 | ∞ | 0.310 | 1.54400 | 60.0 |
| 28 | ∞ | 1.154 | | |
| 29 | ∞ | 0.500 | 1.49000 | 70.0 |
| 30 | ∞ | | | |

Coefficients of Aspherical Surfaces

| | K | B | C | D | E |
|---|---|---|---|---|---|
| 15* | −9.46E−01 | 9.11E−05 | 2.83E−07 | 8.00E−09 | 1.60E−11 |
| 19* | −4.59E−01 | −2.18E−04 | −7.46E−07 | −5.05E−08 | 0.00E+00 |

Other Data, with Zoom Ratio of 15.8

| | Wide-angle | Intermediate | Telephoto |
|---|---|---|---|
| Focal length | 5.18 | 26.40 | 81.78 |
| F-number | 1.65 | 2.87 | 3.30 |
| Half angle of view | 30.10 | 6.37 | 2.10 |
| Image height | 3.00 | 3.00 | 3.00 |
| Overall length | 80.2 | 80.2 | 80.2 |
| BF | 11.96 | 16.02 | 7.67 |

| Gap | Wide-angle | Intermediate | Telephoto |
|-----|------------|--------------|-----------|
| d5  | 0.6        | 19.730       | 26.451    |
| d13 | 27.22139   | 8.091        | 1.370     |
| d20 | 6.21235    | 2.150        | 10.502    |
| d23 | 8.56027    | 12.623       | 4.271     |

| Gap | Wide-angle | Intermediate | Telephoto |
|-----|------------|--------------|-----------|
| d5  | 0.600      | 19.479       | 26.112    |
| d13 | 26.892     | 8.013        | 1.380     |
| d20 | 6.886      | 2.150        | 10.644    |
| d23 | 8.059      | 12.795       | 4.301     |

NUMERICAL EXAMPLE 4

| i | Ri | di | Ni | vi |
|---|------|------|------|------|
| 1 | 60.534 | 1.600 | 1.84666 | 23.8 |
| 2 | 30.254 | 6.000 | 1.60311 | 60.6 |
| 3 | −181.323 | 0.200 | | |
| 4 | 24.529 | 3.300 | 1.71300 | 53.9 |
| 5 | 52.679 | (Variable) | | |
| 6 | 75.400 | 0.750 | 1.88300 | 40.8 |
| 7 | 6.824 | 2.092 | | |
| 8 | 36.855 | 0.700 | 1.84666 | 23.8 |
| 9 | 16.925 | 1.575 | | |
| 10 | −28.260 | 0.650 | 1.77250 | 49.6 |
| 11 | 28.114 | 0.108 | | |
| 12 | 15.271 | 1.800 | 1.92286 | 18.9 |
| 13 | −194.270 | (Variable) | | |
| 14 | (Stop) | 2.051 | | |
| 15* | 10.607 | 3.170 | 1.69350 | 53.2 |
| 16* | 43.216 | 3.099 | | |
| 17 | 81.313 | 0.750 | 1.84666 | 23.8 |
| 18 | 13.505 | 0.455 | | |
| 19* | 15.170 | 2.400 | 1.58313 | 59.4 |
| 20* | −143.843 | (Variable) | | |
| 21 | 18.438 | 3.080 | 1.63854 | 55.4 |
| 22 | −15.365 | 0.600 | 1.84666 | 23.8 |
| 23 | −34.828 | (Variable) | | |
| 24 | ∞ | 0.700 | 1.51400 | 70.0 |
| 25 | ∞ | 0.700 | 1.51633 | 64.1 |
| 26 | ∞ | 1.154 | | |
| 27 | ∞ | 0.700 | 1.49000 | 70.0 |
| 28 | ∞ | | | |

Coefficients of Aspherical Surfaces

|     | K | B | C | D | E |
|-----|------|------|------|------|------|
| 15* | −8.57E−01 | 8.33E−05 | 6.18E−08 | 8.86E−09 | 5.77E−12 |
| 16* | 5.41E−02 | 7.49E−08 | 1.63E−09 | 0.00E+00 | 0.00E+00 |
| 19* | −1.57E+00 | −1.72E−04 | −5.33E−08 | −5.82E−08 | 0.00E+00 |
| 20* | −1.19E+01 | 5.56E−07 | 2.44E−08 | 0.00E+00 | 0.00E+00 |

Other Data, with Zoom Ratio of 15.8

|                   | Wide-angle | Intermediate | Telephoto |
|-------------------|------------|--------------|-----------|
| Focal length      | 5.18       | 26.28        | 81.78     |
| F-number          | 1.66       | 2.87         | 3.30      |
| Half angle of view| 30.10      | 6.51         | 2.10      |
| Image height      | 3.00       | 3.00         | 3.00      |
| Overall length    | 80.3       | 80.3         | 80.3      |
| BF                | 11.52      | 16.26        | 7.78      |

TABLE 1

|               |          | Example 1 | Example 2 | Example 3 | Example 4 |
|---------------|----------|-----------|-----------|-----------|-----------|
| Condition (1) | f31/f3   | 0.84      | 0.89      | 0.79      | 0.86      |
| Condition (2) | f2/fw    | −1.49     | −1.53     | −1.52     | −1.47     |
| Condition (3) | f3/fw    | 4.48      | 4.73      | 4.67      | 4.37      |
| Condition (4) | β2t/β2w  | 22.7      | 25.0      | 24.1      | 21.3      |
| Condition (5) | R31/D31  | 3.971     | 3.910     | 3.469     | 3.346     |
| Condition (6) | v2p      | 18.9      | 18.9      | 18.9      | 18.9      |
| Condition (7) | N2p      | 1.92      | 1.92      | 1.92      | 1.92      |

According to the embodiments described above, a zoom lens is provided in a small overall size with a wide angle of view and high optical performance over the entire zoom range.

A fifth embodiment of the present invention will now be described with reference to FIG. 17, in which the zoom lens according to any of the first to fourth embodiments of the present invention is applied to an image-taking optical system included in a digital still camera.

A camera shown in FIG. 17 includes a camera body 20 and an image-taking optical system 21, which is the zoom lens described in any of the first to fourth embodiments.

The camera body 20 houses a solid-state image pickup device (photoelectric conversion element) 22, such as a CCD sensor or a CMOS sensor, that receives an optical image of an object formed by the image-taking optical system 21. The camera further includes a memory 23 that stores information on the object image that has been subjected to photoelectric conversion performed by the solid-state image pickup device 22.

The camera further includes a viewfinder 24, which is a liquid crystal display panel or the like, through which the object image formed on the solid-state image pickup device 22 is observed.

A sixth embodiment of the present invention will now be described with reference to FIG. 18, in which the zoom lens according to any of the first to fourth embodiments of the present invention is applied to an image-taking optical system included in a video camera (an optical apparatus).

A video camera shown in FIG. 18 includes a video camera body 10 and an image-taking optical system 11, which is the zoom lens of any of the first to fourth exemplary embodiments.

The video camera body 10 houses a solid-state image pickup device (a photoelectric conversion element) 12, such as a CCD sensor or a CMOS sensor, that receives an optical image of an object formed by the image-taking optical system 11, and a recording unit 13 that records information on the object image subjected to photoelectric conversion performed by the solid-state image pickup device 12.

The video camera further includes a viewfinder 14 through which the object image displayed on a display device (not shown) is observed.

The display device includes a liquid crystal panel or the like, and displays the object image formed on the solid-state image pickup device 12.

Thus, by applying the zoom lens according to any of the first to fourth embodiments of the present invention to an image pickup apparatus such as a digital still camera or a video camera, an image pickup apparatus having a small size and high optical performance is realized.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-236320 filed Sep. 16, 2008, which is hereby incorporated by reference herein in its entirety.

What is claimed is:

1. A zoom lens comprising, in order from an object side to an image side:
    a first lens unit having a positive refractive power;
    a second lens unit having a negative refractive power and configured to move during zooming;
    a third lens unit having a positive refractive power and including a positive lens element at a position nearest to an object-side end; and
    a fourth lens unit having a positive refractive power and configured to move during zooming,
    wherein the second lens unit includes at least three negative lens elements arranged successively and independently along an optical axis and at least one positive lens element, and
    wherein the zoom lens satisfies the following conditional expressions:

$0.65 < f31/f3 < 1.05$ $-1.80 < f2/fw < -1.35$ $3.50 < f3/fw < 5.60$ where fw denotes a focal length of the zoom lens at a wide-angle end, f2 and f3 denote focal lengths of the second and third lens units, respectively, and f31 denotes a focal length of a positive lens element of the third lens unit nearest to the object-side end.

2. The zoom lens according to claim 1, satisfying the following conditional expression:

$18.0 < \beta 2t/\beta 2w < 40.0$ where $\beta 2w$ and $\beta 2t$ denote imaging magnifications of the second lens unit at the wide-angle end and at a telephoto end, respectively.

3. The zoom lens according to claim 1,
    wherein the positive lens element of the third lens unit nearest to the object-side end has a meniscus shape with a convex object-side surface, and
    wherein the zoom lens satisfies the following conditional expression:

$2.8 < R31/D31 < 5.0$ where R31 and D31 denote a radius of curvature of the object-side surface and a thickness of the positive lens element, respectively.

4. The zoom lens according to claim 1, satisfying the following conditional expressions:

$v2p < 24.0$ $1.82 < N2p$ where v2p and N2p denote an Abbe number and a refractive index of a material composing the at least one positive lens element included in the second lens unit, respectively.

5. The zoom lens according to claim 1, wherein the third lens unit has, in order from the object side to the image side, no more than a positive lens element having an aspherical surface, a negative lens element, and a positive lens element having an aspherical surface.

6. The zoom lens according to claim 1, wherein the second lens unit has, in order from the object side to the image side, no more than two meniscus negative lens elements each having a convex object-side surface, a biconcave negative lens element, and a positive lens element having a convex object-side surface.

7. The zoom lens according to claim 1,
    wherein the first lens unit has no more than a cemented lens in which a meniscus negative lens element having a convex object-side surface and a positive lens element are cemented together, and a meniscus positive lens element having a convex object-side surface, and
    wherein the fourth lens unit has no more than a cemented lens in which a biconvex positive lens element and a negative lens element are cemented together.

8. An image pickup apparatus comprising:
    a zoom lens; and
    a solid-state image pickup device configured to receive an optical image formed by the zoom lens,
    wherein the zoom lens include, in order from an object side to an image side,
    a first lens unit having a positive refractive power;
    a second lens unit having a negative refractive power and configured to move during zooming;
    a third lens unit having a positive refractive power and including a positive lens element at a position nearest to an object-side end; and
    a fourth lens unit having a positive refractive power and configured to move during zooming,
    wherein the second lens unit includes at least three negative lens elements arranged successively and independently along an optical axis and at least one positive lens element, and
    wherein the zoom lens satisfies the following conditional expressions:

$0.65 < f31/f3 < 1.05$ $-1.80 < f2/fw < -1.35$ $3.50 < f3/fw < 5.60$ where fw denotes a focal length of the zoom lens at a wide-angle end, f2 and f3 denote focal lengths of the second and third lens units, respectively, and f31 denotes a focal length of a positive lens element of the third lens unit nearest to the object-side end.

* * * * *